(12) United States Patent
Ino et al.

(10) Patent No.: US 11,579,081 B2
(45) Date of Patent: Feb. 14, 2023

(54) STRUCTURE OF OPTICAL SENSOR HAVING LIGHT-EMITTING ELEMENT AND PLURALITY OF LIGHT-RECEIVING ELEMENTS

(71) Applicant: CANON KABUSHIKI KAISHA, Tokyo (JP)

(72) Inventors: Kazushi Ino, Shizuoka (JP); Takuya Mukaibara, Shizuoka (JP); Kazutaka Yaguchi, Shizuoka (JP); Junya Azami, Shizuoka (JP); Hiroshi Kita, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/173,477

(22) Filed: Feb. 11, 2021

(65) Prior Publication Data

US 2021/0255102 A1 Aug. 19, 2021

(30) Foreign Application Priority Data

Feb. 17, 2020 (JP) .............................. JP2020-024665
Dec. 14, 2020 (JP) .............................. JP2020-206985

(51) Int. Cl.
*G01N 21/55* (2014.01)
*G03G 15/00* (2006.01)

(52) U.S. Cl.
CPC ......... *G01N 21/55* (2013.01); *G03G 15/5054* (2013.01); *G01N 2021/555* (2013.01); *G01N 2201/063* (2013.01); *G03G 2215/00059* (2013.01)

(58) Field of Classification Search
CPC ............ G01N 21/55; G01N 2021/555; G01N 2201/063; G03G 15/5054; G03G 2215/00059
See application file for complete search history.

(56) References Cited

U.S. PATENT DOCUMENTS

| 4,698,491 A | 10/1987 | Lysen |
| 6,229,721 B1 | 5/2001 | Mano et al. |
| 8,929,784 B2 | 1/2015 | Takazawa |

(Continued)

FOREIGN PATENT DOCUMENTS

| JP | H10-221902 A | 8/1998 |
| JP | 2008-249714 A | 10/2008 |

(Continued)

OTHER PUBLICATIONS

Co-Pending U.S. Appl. No. 17/174,223.

*Primary Examiner* — Sandra Brase
(74) *Attorney, Agent, or Firm* — Venable LLP

(57) ABSTRACT

A housing includes a first opening and a second opening, and encloses a light-emitting element, a first light receiving unit, and a second light receiving unit. The first opening is provided in a first light guide path arranged between the light-emitting element and a first irradiated region of the target surface, and is arranged so that light output from the light-emitting element travels toward the first irradiated region. The second opening is provided in a second light guide path arranged between the first irradiated region and the first light receiving unit, and is arranged so that diffused reflection light from the toner image passes through when the toner image passes the first irradiated region.

20 Claims, 33 Drawing Sheets

(56) References Cited

U.S. PATENT DOCUMENTS

| | | |
|---|---|---|
| 9,075,368 B2 | 7/2015 | Mukaibara |
| 9,195,176 B2 | 11/2015 | Seki et al. |
| 9,927,752 B2 | 3/2018 | Ino et al. |
| 10,228,647 B2 | 3/2019 | Ino et al. |
| 10,503,109 B2 | 12/2019 | Ino et al. |
| 2004/0251435 A1* | 12/2004 | Sawayama ............ G01N 21/55 250/559.16 |
| 2011/0242376 A1 | 10/2011 | Ando |
| 2013/0051838 A1 | 2/2013 | Takazawa |
| 2013/0272740 A1 | 10/2013 | Nakagawa et al. |
| 2013/0286133 A1 | 10/2013 | Furuta et al. |
| 2015/0177653 A1 | 6/2015 | Seki et al. |
| 2015/0211992 A1* | 7/2015 | Ishizumi ............... G01N 21/55 399/49 |
| 2017/0131670 A1 | 5/2017 | Ino et al. |
| 2018/0173144 A1 | 6/2018 | Ino et al. |
| 2018/0292776 A1 | 10/2018 | Ino et al. |
| 2020/0223186 A1 | 7/2020 | Sato |

FOREIGN PATENT DOCUMENTS

| | | |
|---|---|---|
| JP | 2013-044878 A | 3/2013 |
| JP | 2013-191835 A | 9/2013 |
| JP | 2015-125187 A | 7/2015 |
| JP | 2017-090597 A | 5/2017 |
| JP | 2018-179681 A | 11/2018 |
| JP | 2019-056831 A | 4/2019 |

\* cited by examiner

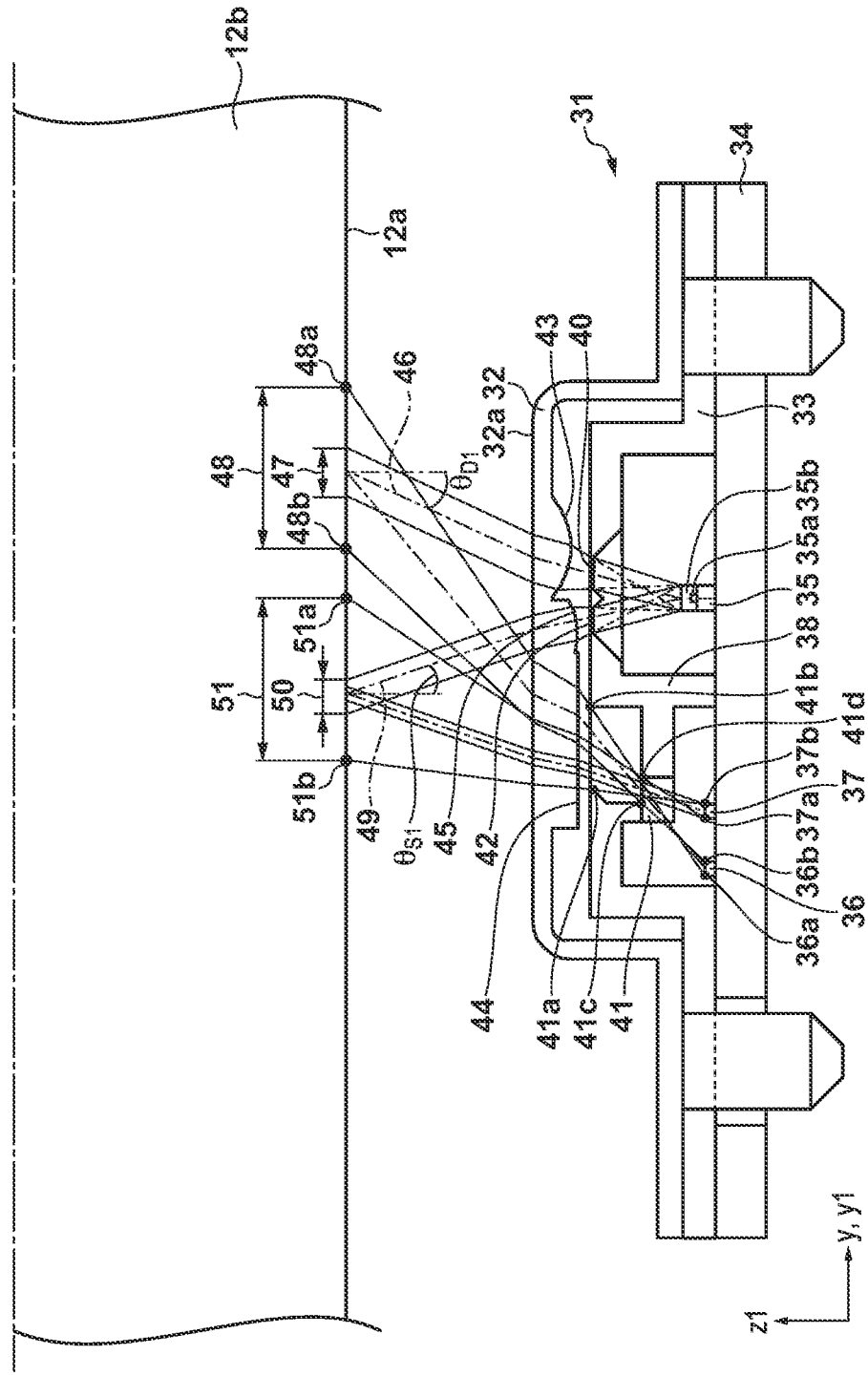

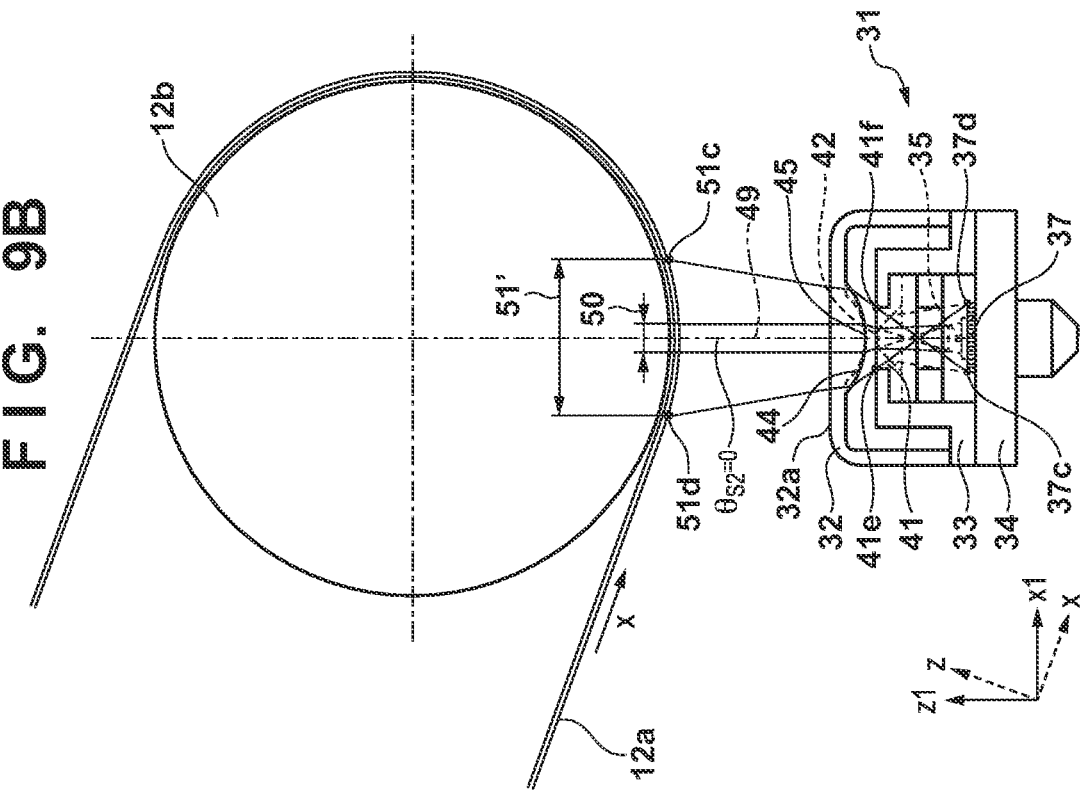
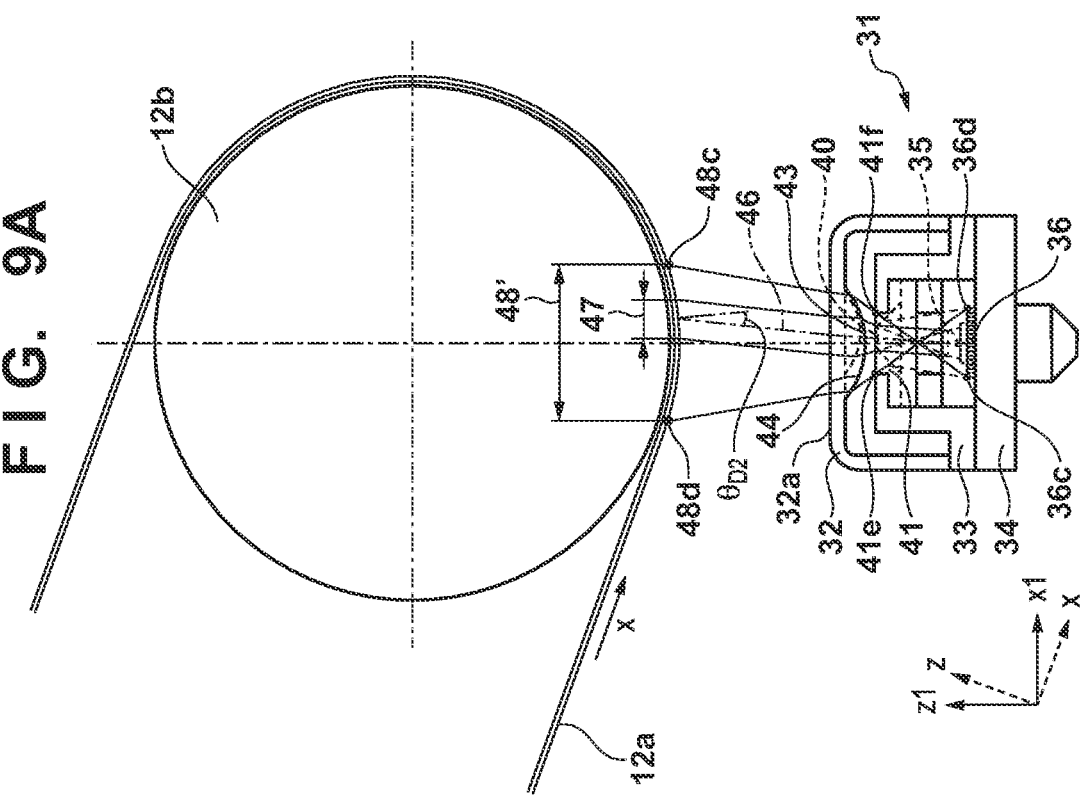

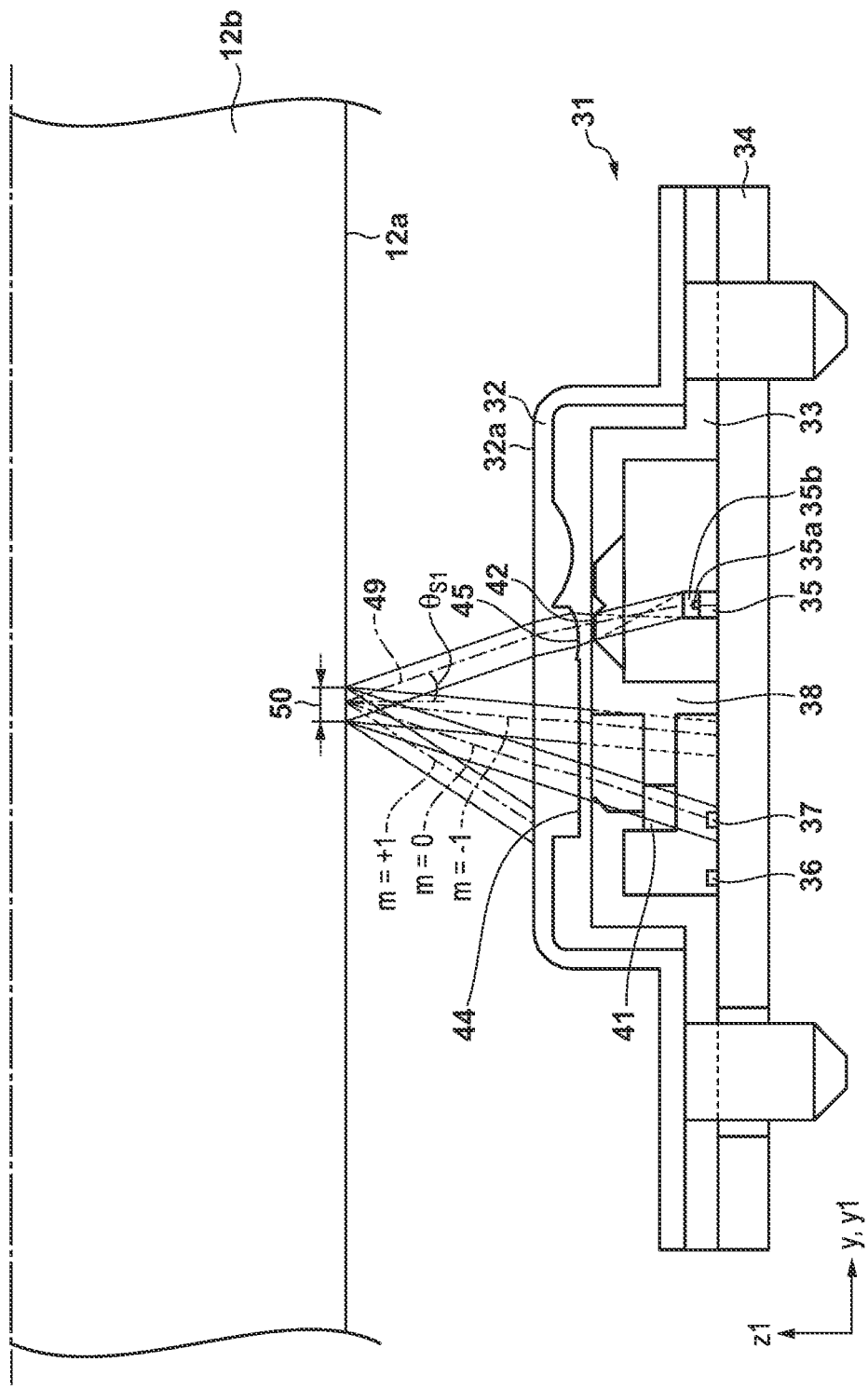

FIG. 13A

| ORDER m | -6TH -ORDER | -5TH -ORDER | -4TH -ORDER | ... | 0TH -ORDER |
|---|---|---|---|---|---|
| DIFFRACTION ANGLE (degree) | -72.89 | -46.55 | -29.76 | ... | +25 |

FIG. 13B

| ORDER m | -1ST -ORDER | 0TH -ORDER | +1ST -ORDER |
|---|---|---|---|
| DIFFRACTION ANGLE (degree) | +5.59 | +19.1 | +33.84 |

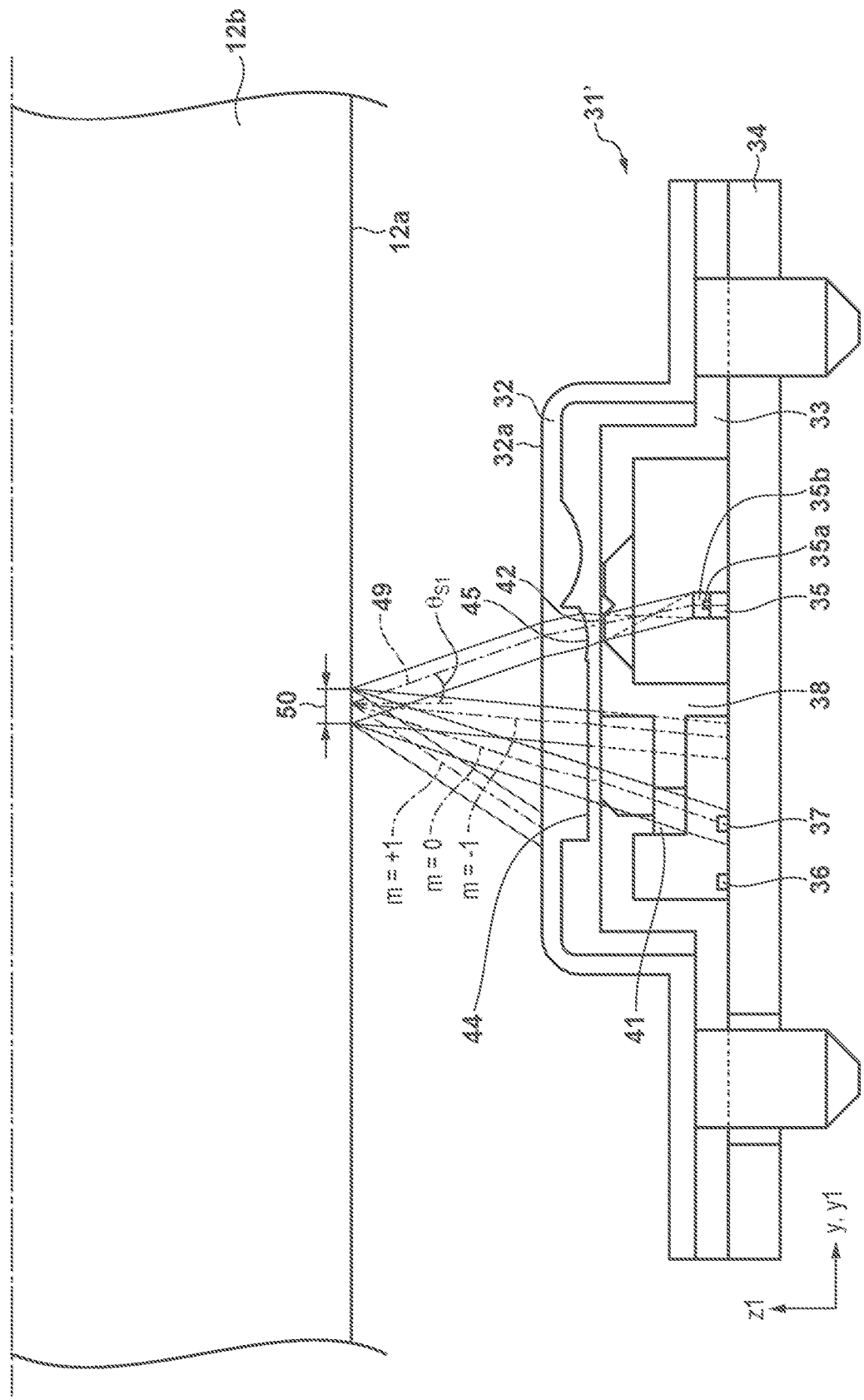

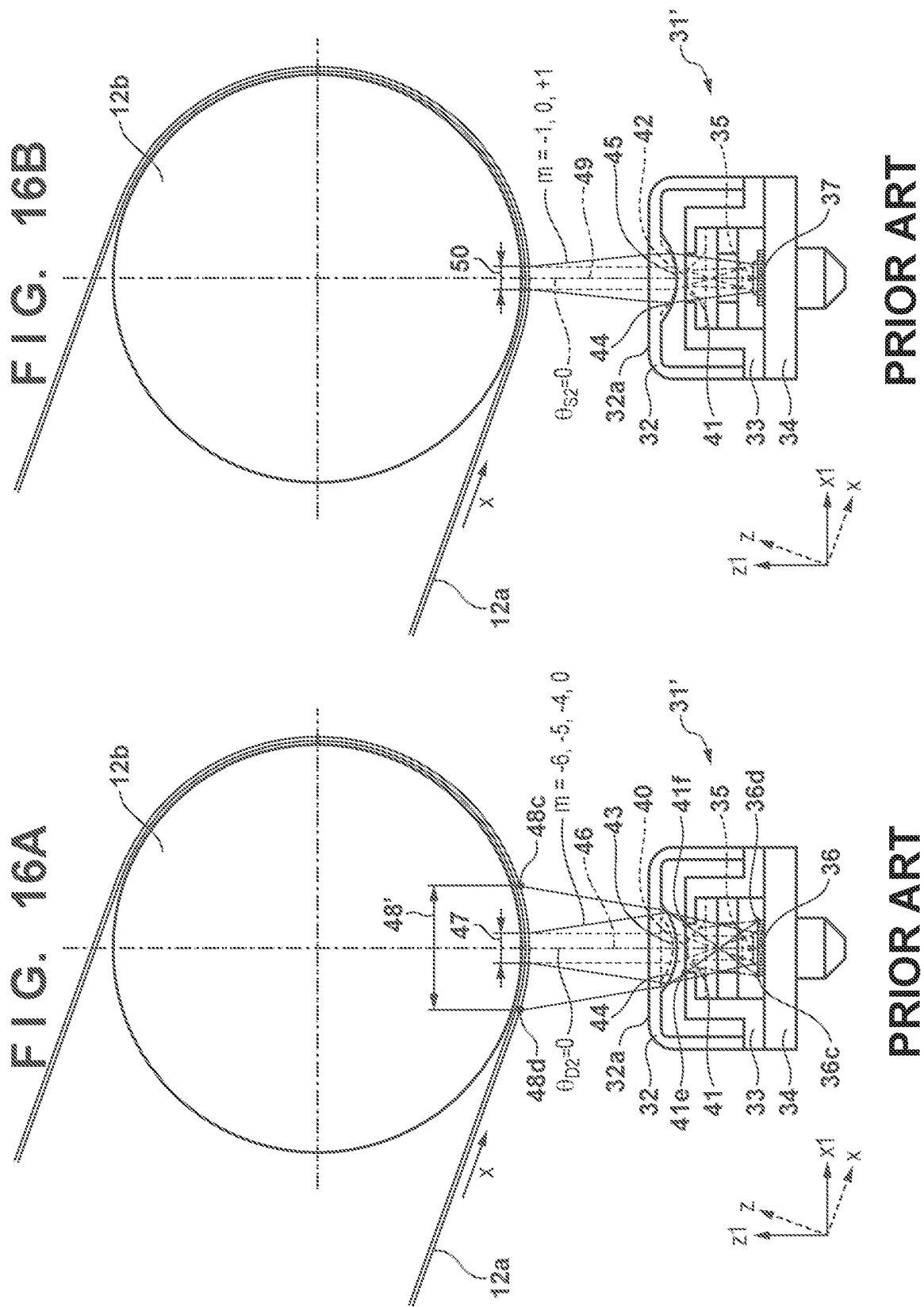

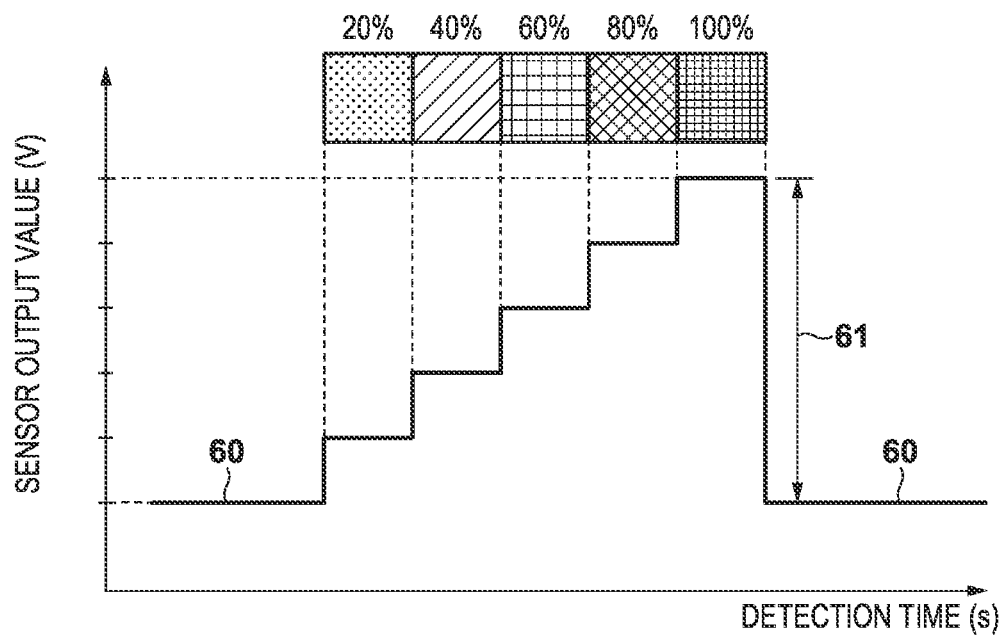
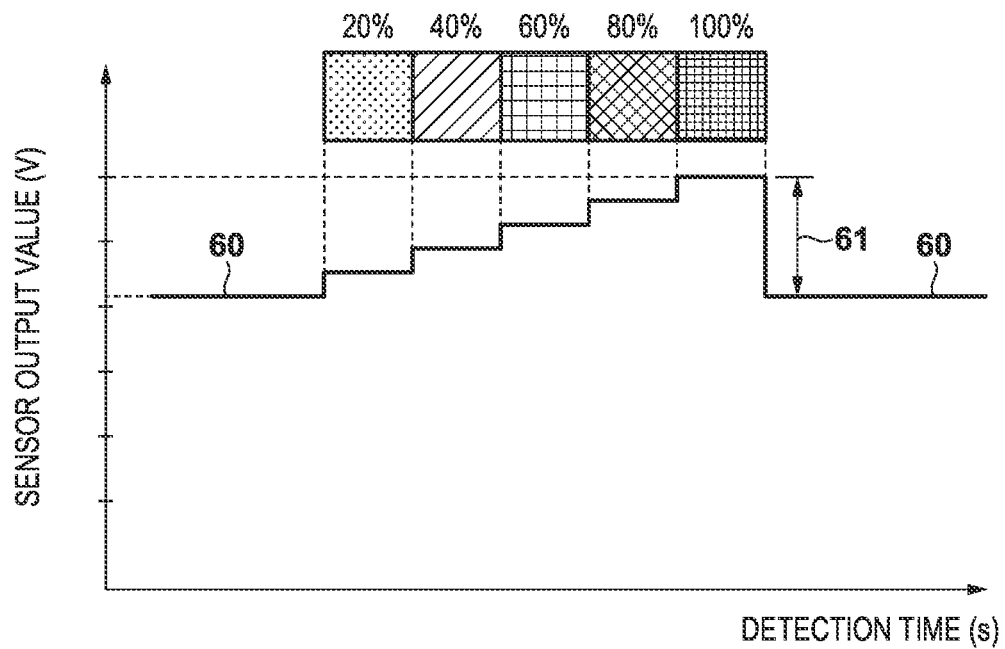

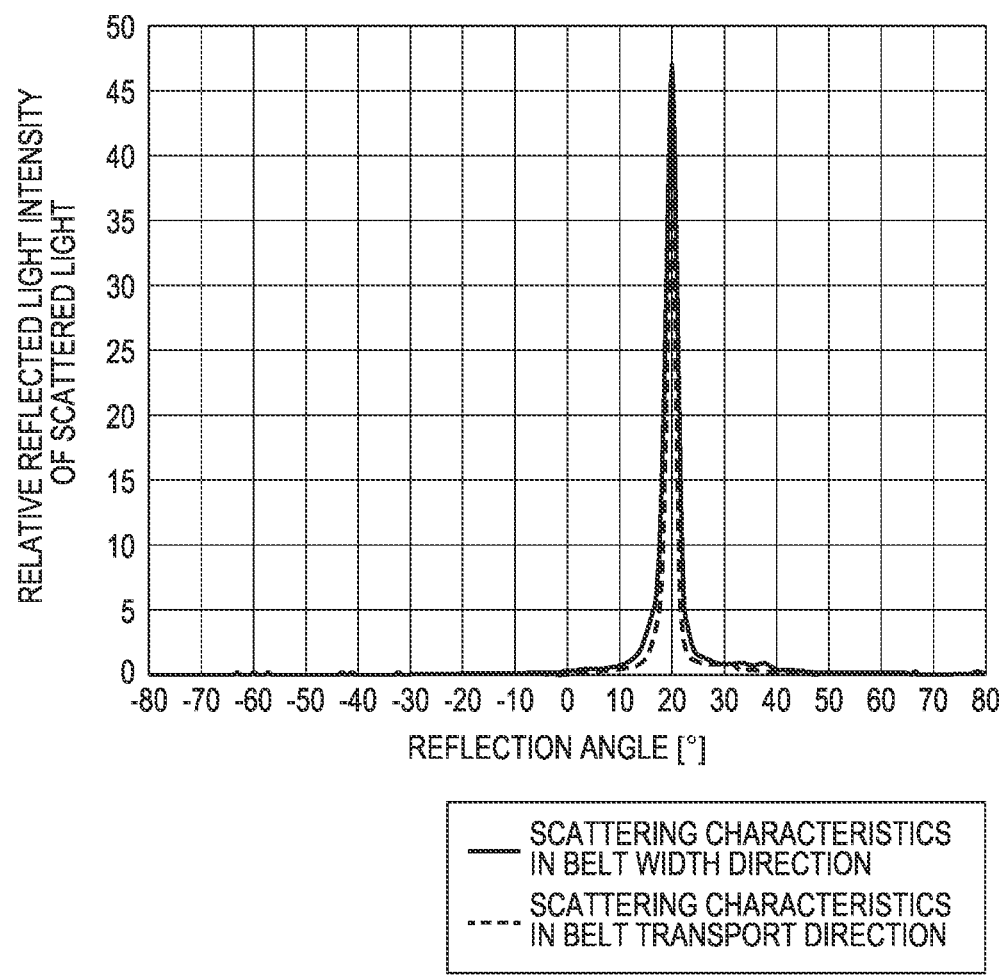

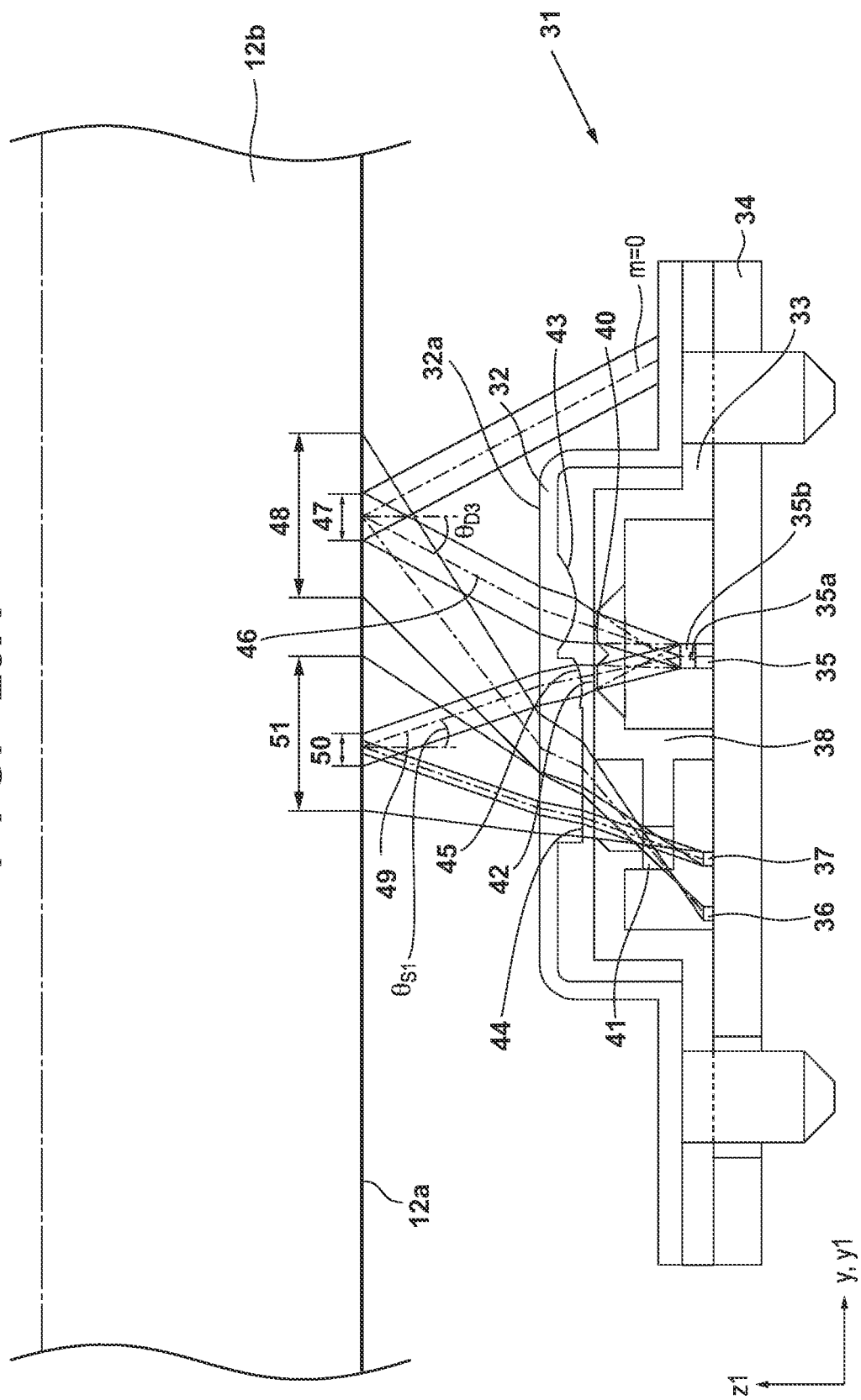

F I G. 31

| ORDER m | -6TH -ORDER | -5TH -ORDER | -4TH -ORDER | ... | -1TH -ORDER | 0TH -ORDER | +1TH -ORDER |
|---|---|---|---|---|---|---|---|
| DIFFRACTION ANGLE (degree) | -63.21 | -41.73 | -26.02 | ... | +14.03 | +28.00 | +44.15 |

STRUCTURE OF OPTICAL SENSOR HAVING LIGHT-EMITTING ELEMENT AND PLURALITY OF LIGHT-RECEIVING ELEMENTS

BACKGROUND OF THE INVENTION

Field of the Invention

The present disclosure relates to a structure of an optical sensor having a light-emitting element and a plurality of light-receiving elements.

Description of the Related Art

An image forming apparatus forms a toner image on a photosensitive drum, transfers the toner image from the photosensitive drum to an intermediate transfer body, and furthermore transfers the toner image from the intermediate transfer body to a sheet. An optical sensor is used to check the transfer position, color reproduction, and the like of the toner image (Japanese Patent Laid-Open No. 2013-191835). Such an optical sensor is called a "toner sensor". Toner remaining on the intermediate transfer body is cleaned using a cleaning blade. Uneven shapes such as grooves are sometimes formed in the surface of the intermediate transfer body in order to improve the durability of the cleaning blade (Japanese Patent Laid-Open No. 2015-125187, Japanese Patent Laid-Open No. 2013-044878).

A toner sensor receives regularly-reflected light from the surface (substrate) of the intermediate transfer body to detect the intermediate transfer body, and receives diffused reflection light from the toner to detect the toner. However, when grooves or the like are formed in the surface of the intermediate transfer body, the regularly-reflected light from the substrate decreases and the diffused reflection light from the substrate increases. As a result, it is difficult to accurately detect the regularly-reflected light from the substrate. Furthermore, diffused reflection light from the substrate is incident on the toner sensor when detecting the toner, which makes it difficult to accurately detect the toner.

SUMMARY OF THE INVENTION

The present invention provides an optical sensor comprising: a light-emitting element that irradiates, with light, a target surface to be irradiated set in one part of a surface of a rotating body that rotates; a first light receiving unit that receives diffused reflection light from a toner image formed on the surface of the rotating body, and a second light receiving unit that receives regularly-reflected light from the surface of the rotating body; a circuit board on which the light-emitting element, the first light receiving unit, and the second light receiving unit are mounted; and a housing including a first opening and a second opening, and provided so as to enclose the light-emitting element, the first light receiving unit, and the second light receiving unit, wherein the first opening is provided in a first light guide path arranged between the light-emitting element and a first irradiated region of the target surface to be irradiated, and is arranged so that light output from the light-emitting element travels toward the first irradiated region, and the second opening is provided in a second light guide path arranged between the first irradiated region and the first light receiving unit, and is arranged so that diffused reflection light from the toner image passes through when the toner image passes the first irradiated region, and regularly-reflected light, as well as diffused reflection light or diffracted light, from the surface of the rotating body do not pass through when the surface of the rotating body passes the first irradiated region.

Further features of the present invention will become apparent from the following description of exemplary embodiments (with reference to the attached drawings).

BRIEF DESCRIPTION OF THE DRAWINGS

FIG. 8 is a diagram illustrating an optical path of an optical sensor.

FIGS. 9A and 9B are diagrams illustrating optical paths of an optical sensor.

FIG. 11 is a diagram illustrating diffracted light of various orders.

FIGS. 13A and 13B are diagrams illustrating diffraction angles of various orders.

FIG. 15 is a diagram illustrating diffracted light of various orders according to a comparative example.

FIGS. 16A and 16B are diagrams illustrating diffracted light of various orders according to a comparative example.

FIGS. 17A and 17B are diagrams illustrating test pattern detection results.

FIG. 28 is a graph illustrating the BRDF of a belt with anisotropic reflective properties.

FIGS. 29A and 29B are diagrams illustrating an optical path of an optical sensor according to a fourth embodiment.

FIG. 31 is a diagram illustrating a diffraction angle of diffracted light according to a fourth embodiment.

DESCRIPTION OF THE EMBODIMENTS

Figure 1:
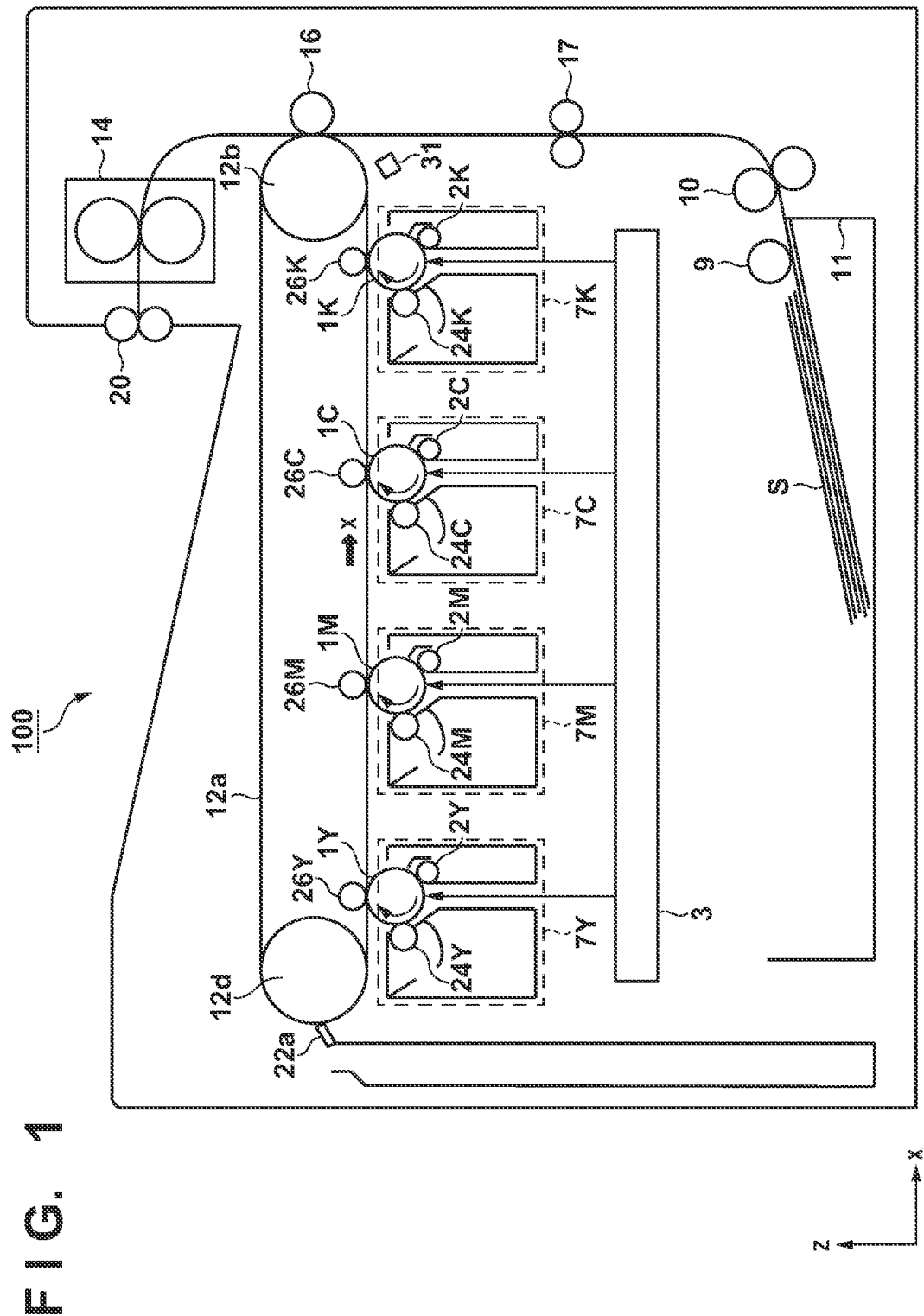
FIG. 1 is a cross-sectional view of an image forming apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

1. Overall Configuration of Image Forming Apparatus

As illustrated in FIG. 1, an image forming apparatus 100 is an electrophotographic color laser printer. The image forming apparatus 100 includes process cartridges 7Y, 7M, 7C, and 7K which can be removed from a main body of the image forming apparatus 100. The four process cartridges 7Y, 7M, 7C, and 7K have the same structure, but form images with different colored toners, i.e., yellow (Y), magenta (M), cyan (C), and black (K), respectively. In the following, the letters Y, M, C, and K will be omitted except when referring to each color individually.

Each process cartridge 7 includes a photosensitive drum 1 serving as an image carrier, a charging roller 2 serving as a charger, and a developing roller 24 serving as a developer. The charging roller 2 uniformly charges the surface of the photosensitive drum 1 using a charging voltage. An exposure device 3 forms an electrostatic latent image by irradiating the surface of the photosensitive drum 1 with light corresponding to an image signal. The developing roller 24 uses a developing voltage to develop the electrostatic latent image using toner and form a toner image.

An intermediate transfer unit includes an intermediate transfer belt 12a, a drive roller 12b that drives the intermediate transfer belt 12a, and a driven roller 12d that is rotated by the intermediate transfer belt 12a. Although the intermediate transfer belt 12a is an endless belt-type intermediate transfer body, a drum-type intermediate transfer body may be used instead. A primary transfer roller 26 is disposed on an inner side of the intermediate transfer belt 12a so as to oppose the photosensitive drum 1. The primary transfer roller 26 transfers the toner image formed on the photosensitive drum 1 onto the intermediate transfer belt 12a using a primary transfer voltage. A multicolor toner image formed by the overlapping transfer of the four color toner images onto the intermediate transfer belt 12a is transported to a secondary transfer roller 16 by the intermediate transfer belt 12a rotating.

A paper feed roller 9 feeds a sheet S from a paper feed cassette 11, which holds the sheet S, to a transport path. A transport roller pair 10 transports the fed sheet S to a resist roller pair 17. The resist roller pair 17 transports the sheet S transported from the feed device to the secondary transfer roller 16. The secondary transfer roller 16 transfers the toner image on the intermediate transfer belt 12a onto the sheet S which has been transported thereto. A fixing device 14 fixes the toner image onto the surface of the sheet S. A paper discharge roller pair 20 discharges the sheet S onto which the toner image has been fixed.

A cleaning blade 22a is a cleaning member that cleans off toner remaining on the intermediate transfer belt 12a. An optical sensor 31 is an optical sensor that detects a test image formed on the intermediate transfer belt 12a. The test image can include a pattern for adjusting the position at which each of the YMCK toner images is formed, a pattern for adjusting the density (tone) and color of the toner images, and the like.

2. Calibration of Image Forming Apparatus

Registration control and density control are examples of calibration performed having formed a test pattern on the intermediate transfer belt 12a. "Registration control" refers to adjusting the image forming position. This reduces color shifts. "Density control" refers to controlling the density of the toner image. This improves the color reproduction.

Figure 2:
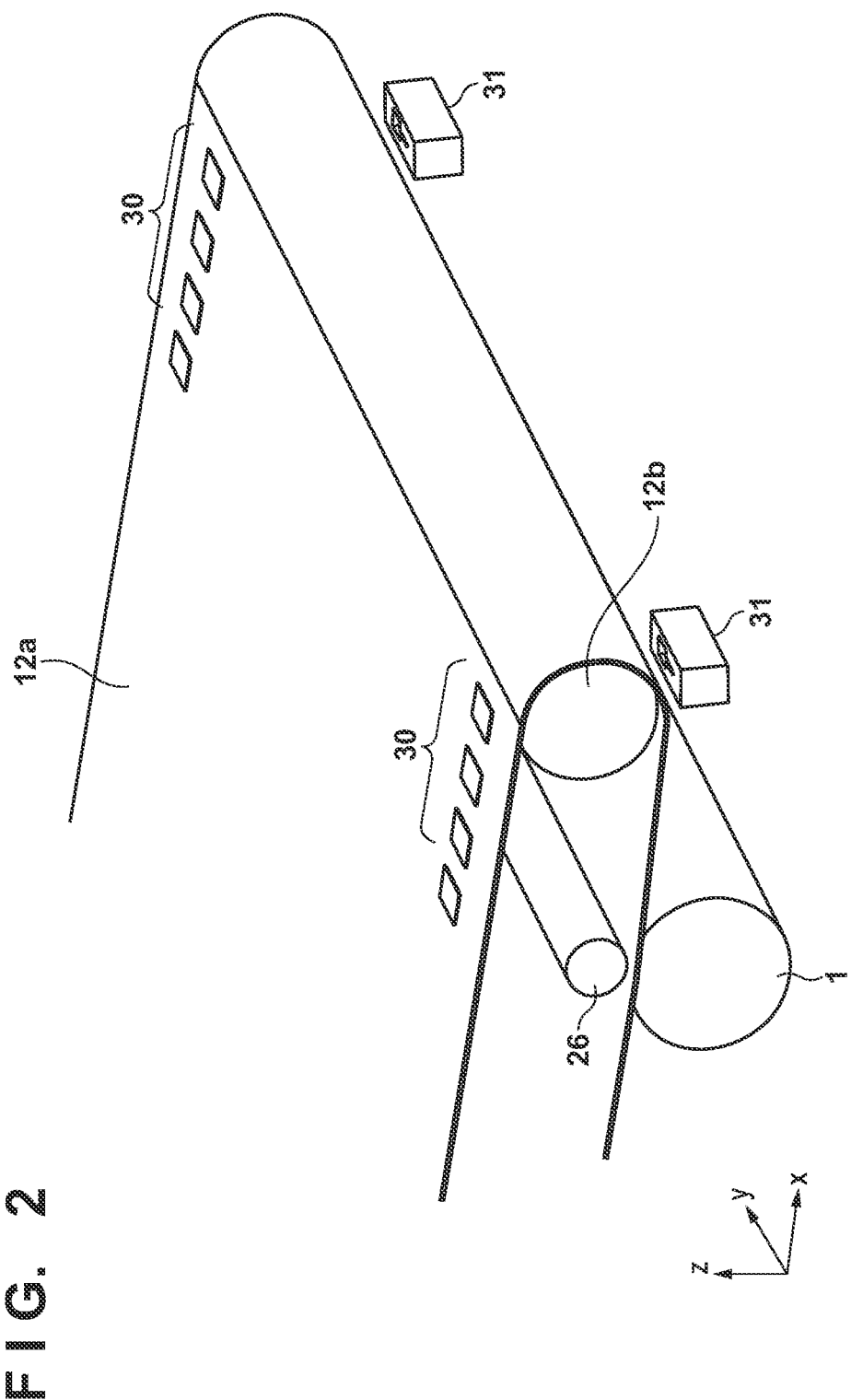
FIG. 2 is a diagram illustrating a test pattern.

As illustrated in FIG. 2, the image forming apparatus 100 performs calibration during a period when the image forming apparatus 100 is not forming an image input by a user. The image forming apparatus 100 forms a test pattern 30 on the intermediate transfer belt 12a and optically detects the test pattern 30 using the optical sensor 31. In this example, two optical sensors 31 are disposed so as to oppose the drive roller 12b of the intermediate transfer belt 12a. The two optical sensors 31 are disposed at different positions in a width direction of the intermediate transfer belt 12a. A direction parallel to this width direction may be defined as a "y direction". A rotation axis of the drive roller 12b is also parallel to the y direction. A movement direction of the intermediate transfer belt 12a may be defined as an "x direction". A direction perpendicular to both the x direction and the y direction may be defined as a "z direction". Three or more of the optical sensors 31 may be disposed as well.

3. Registration Control

Figure 3:
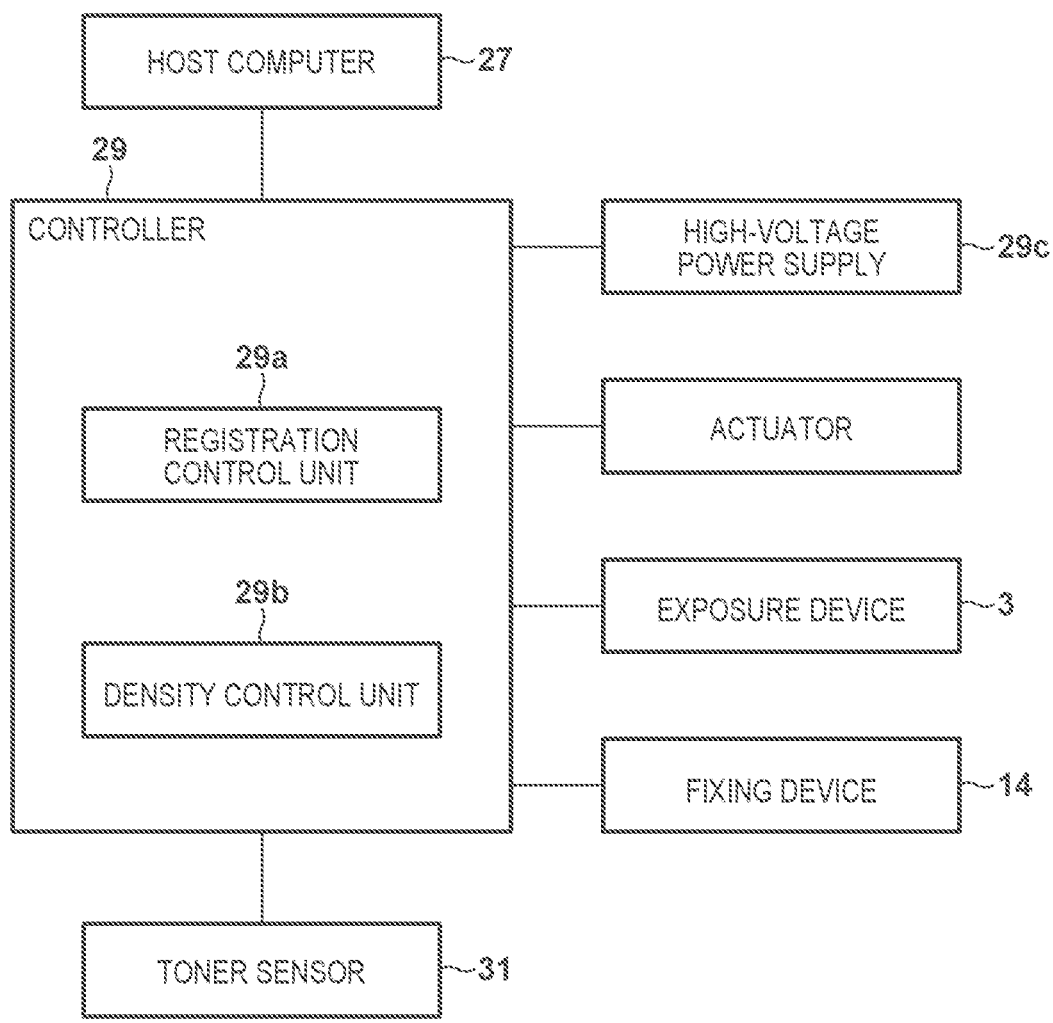
FIG. 3 is a diagram illustrating a controller.

As illustrated in FIG. 3, a controller 29 is a control circuit that comprehensively controls the image forming apparatus 100, and may include, for example, a storage device and a central processing unit (CPU). The controller 29 includes a registration control unit 29a that executes the registration control and a density control unit 29b that executes the density control of the toner image.

The registration control unit 29a controls the exposure device 3 so that a scanning speed of the exposure device 3 is a predetermined target value and an exposure light amount is a predetermined target value. The registration control unit 29a furthermore adjusts an exposure start timing of the exposure device 3 on the basis of a result of the optical sensors 31 detecting the test pattern 30. As a result, the position at which each of the Y, M, C, and K images is formed is adjusted, which corrects color shift. The adjustment of the image forming position includes adjustment of the position of the toner image in a main scanning direction, the position in a sub scanning direction, and the width (magnification) of the toner image in the main scanning direction.

The registration control unit 29a controls the image forming apparatus 100 to form, on the intermediate transfer belt 12a, a test pattern 30 for detecting color shift for each color, the test pattern 30 having i rows. i is an integer of 2 or more. The registration control unit 29a uses i optical sensors 31 to detect the test pattern 30 and obtain the amount of color shift. The "amount of color shift" is a relative amount of color shift in the main scanning direction, a relative amount of color shift in the sub scanning direction, a magnification in the main scanning direction, a relative tilt, and so on between each color. On the basis of the detection results, the registration control unit 29a corrects a writing timing (exposure start timing) of the image for each color so as to reduce the relative amount of color shift for each color.

4. Toner Image Density Control

The density of a toner image may fluctuate depending on the temperature and humidity conditions of the environment in which the image forming apparatus 100 is installed, the extent to which the image forming station for each color has been used, and the like. To correct such fluctuation, the density control unit 29b controls the image forming apparatus 100 to form the test pattern 30 for density detection on the intermediate transfer belt 12a. The density control unit 29b detects the density of the test pattern 30 using the optical sensors 31 and controls density factors on the basis of a result of the detection to obtain desired density characteristics.

Specifically, the density control unit 29b controls a high-voltage power supply 29c to set density factors such as charging voltage, developing voltage, and exposure light amount to specific values, and starts forming the test pattern 30. Image data for forming the test pattern 30 may be generated by a host computer 27 or by the controller 29. The density control unit 29b stores the density factor adjustment results in memory or the like and uses the adjustment results when forming an image input by the user on the sheet S.

5. Configuration of Intermediate Transfer Belt

Figure 4A:
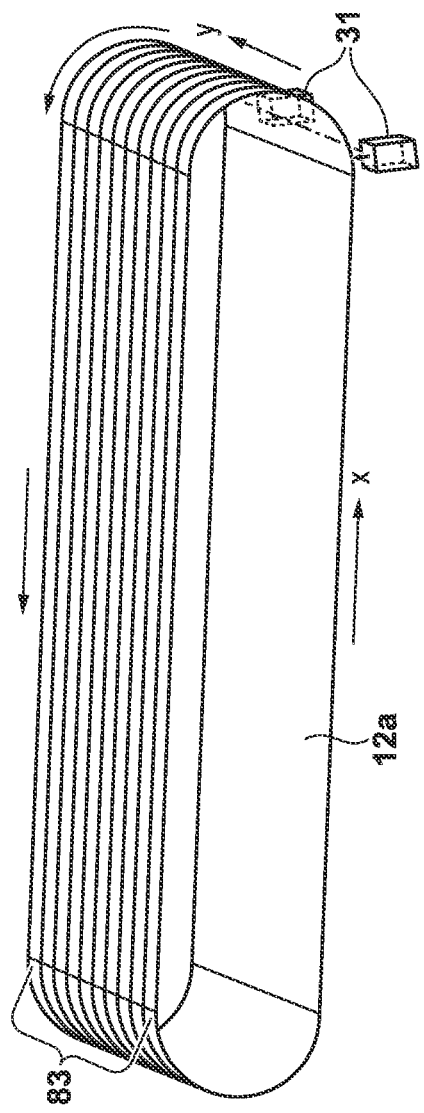
FIGS. 4A and 4B are diagrams illustrating grooves in an intermediate transfer belt.
Figure 4B:
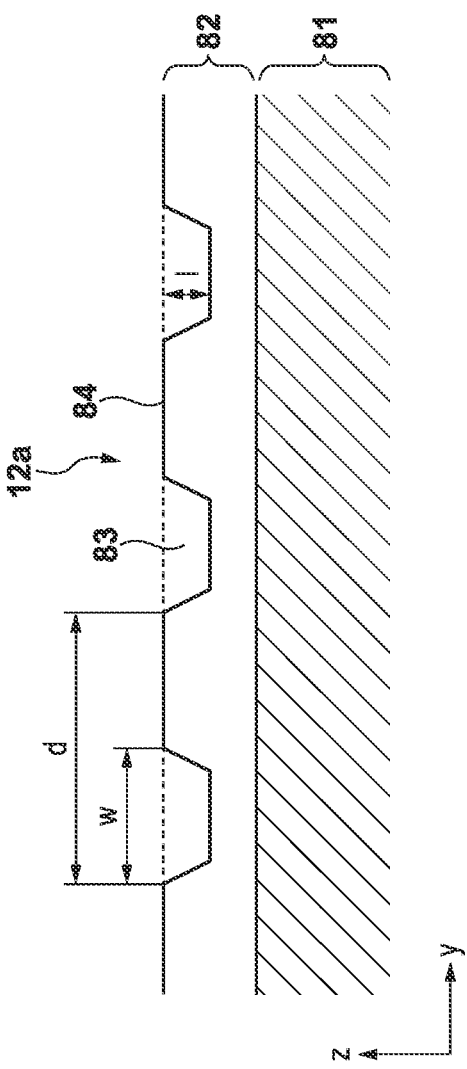

As illustrated in FIG. 4A, a plurality of grooves 83 for reducing friction against the cleaning blade 22a, which is formed from a material such as urethane rubber, may be formed in the intermediate transfer belt 12a. FIG. 4B is a cross-sectional view of the intermediate transfer belt 12a cut parallel to a zy plane.

As illustrated in FIG. 4A, the fine grooves 83 are formed substantially parallel to the x direction. As illustrated in FIG. 4B, the intermediate transfer belt 12a includes a base layer 81 and a surface layer 82 formed on the base layer 81. The base layer 81 is the thickest layer among the plurality of layers constituting the intermediate transfer belt 12a. The surface layer 82 constitutes the surface (outer circumferential surface) of the intermediate transfer belt 12a and carries the toner transferred from the photosensitive drum 1.

The base layer 81 may be, for example, a layer, approximately 70 μm thick, constituted by polyethylene naphthalate resin with carbon black dispersed and mixed therein as an electrical resistance modifier. Polyethylene naphthalate resin is merely one example of the material of the base layer 81, and any thermoplastic resin can be used. Materials such as polyimide, polyester, polycarbonate, polyacrylate, acrylonitrile-butadiene-styrene copolymer (ABS), polyphenylene sulfide (PPS), polyvinylidene fluoride (PVdF), and mixtures of such resins can be used. In addition to electronic conductive agents, an ionic conductive agent, for example, may be used as the electrical resistance modifier (conductive agent).

The surface layer 82 may be a layer, approximately 3 μm thick, constituted by an acrylic resin with an electrical resistance modifier (e.g., zinc oxide) dispersed and mixed therein. From the viewpoint of strength, such as resistance to wear and resistance to cracking, a resin material (a curable resin) may be used as the material of the surface layer 82. Among curable resins, for example, acrylic resins obtained by curing acrylic copolymers containing unsaturated double bonds may be used. In addition to electronic conductive agents, an ionic conductive agent, for example, may be used as the electrical resistance modifier (conductive agent).

In general, the combination of urethane rubber and acrylic resin has high frictional resistance due to sliding. As a result, the cleaning blade 22a is prone to being bent back, wear due to repeated use, and so on. The surface of the intermediate transfer belt 12a may be processed to have a fine uneven shape in order to reduce friction. For example, an average interval d of the plurality of grooves 83 in the y direction may be greater than or equal to 2 μm and less than or equal to 10 μm. The grooves 83 may be referred to as "groove shapes" or "groove parts". The grooves 83 are provided in substantially the entirety of the outer circumferential surface of the intermediate transfer belt 12a. In the y direction, the plurality of grooves 83 are formed in substantially the entirety of a contact region where the cleaning blade 22a and the intermediate transfer belt 12a contact each other. The grooves 83 need not be provided in regions of the surface layer 82 of the intermediate transfer belt 12a that do not come into contact with the cleaning blade 22a.

Grinding, cutting, imprinting, and the like are generally employed as techniques to form fine uneven shapes. Any processing technique that enables the desired interval d to be obtained can be used. From the viewpoint of processing cost, productivity, and the like, an imprinting process that takes advantage of the light-curing properties of acrylic resin, which is the base material of the surface layer 82, may be used.

A width of each of the grooves 83 (a groove width) w is the width of an opening in the y direction, which is substantially orthogonal to a longitudinal axis direction of the grooves 83. The groove width w is the distance of a section where the surface layer 82 is relatively thin. The surface layer 82 is thickest at an uppermost surface 84. The groove width w is, for example, 1.2 μm. The groove width w may be lower than the average particle diameter of the toner. To be more specific, the groove width w may be lower than half the average particle diameter of the toner. Having the groove width w be smaller than the average particle diameter of the toner makes it more difficult for the toner to enter the grooves 83, and the toner is therefore more reliably cleaned by the cleaning blade 22a. To suppress collapsing of convex portions of the mold used to form the grooves 83, the groove width w may be set to greater than or equal to 0.5 μm, for example. More specifically, the groove width w may be set to be greater than or equal to 0.5 μm and less than or equal to 6 μm. Furthermore, the groove width w may be set to be greater than or equal to 1 μm and less than or equal to 2 μm.

A depth of each of the grooves 83 (a groove depth) l is defined as a depth from the opening of the groove 83 (the uppermost surface 84) to a bottom part of the groove 83 in a thickness direction of the intermediate transfer belt 12a. For example, the groove depth l is 0.45 μm at the initial stage of use of the intermediate transfer belt 12a (when the belt is new). The groove depth l may, for example, be greater than or equal to 0.2 μm and less than the thickness of the surface layer 82 at the initial stage of use of the intermediate transfer belt 12a. If the groove depth l is too small, it is easy for the grooves 83 to disappear or for cleaning problems to occur due to the surface layer 82 being worn down. Having the groove depth l be less than the thickness of the surface layer 82 ensures that the grooves 83 do not reach the base layer 81, and are only present on the surface layer 82. The surface layer 82 may be designed so that the thickness thereof is greater than or equal to 1 μm and less than or equal to 5 μm, from the viewpoint of reducing a loss of durability due to the layer being too thin, and reducing cracking of the surface layer due to the layer being too thick. More typically, the thickness of the surface layer 82 is set to be greater than or equal to a thickness at which the grooves 83 do not reach the base layer 81, and less than or equal to 3 μm.

The interval d between the grooves 83 is defined as the distance from one end of the opening of a jth groove 83 in they direction (e.g., a left end) to one end of the opening of a j+1th groove 83 in they direction (e.g., a left end). j is an integer of 1 or more. The plurality of grooves 83 are formed at an equal pitch of 3.7 μm across substantially the entirety of they direction (i.e., at a constant interval d). The interval d may be defined based on a right end of the opening, or as the interval between the bottom parts of two adjacent grooves 83. If the interval d is too small, it may be difficult to form a consistent uneven shape. If, however, the interval d is too large, it may be difficult to suppress wear on the cleaning blade 22a. Accordingly, the interval d may be set to be greater than or equal to 2 μm and less than or equal to 10 μm, and more specifically, greater than or equal to 3 μm and less than or equal to 4 μm.

Figure 5A:
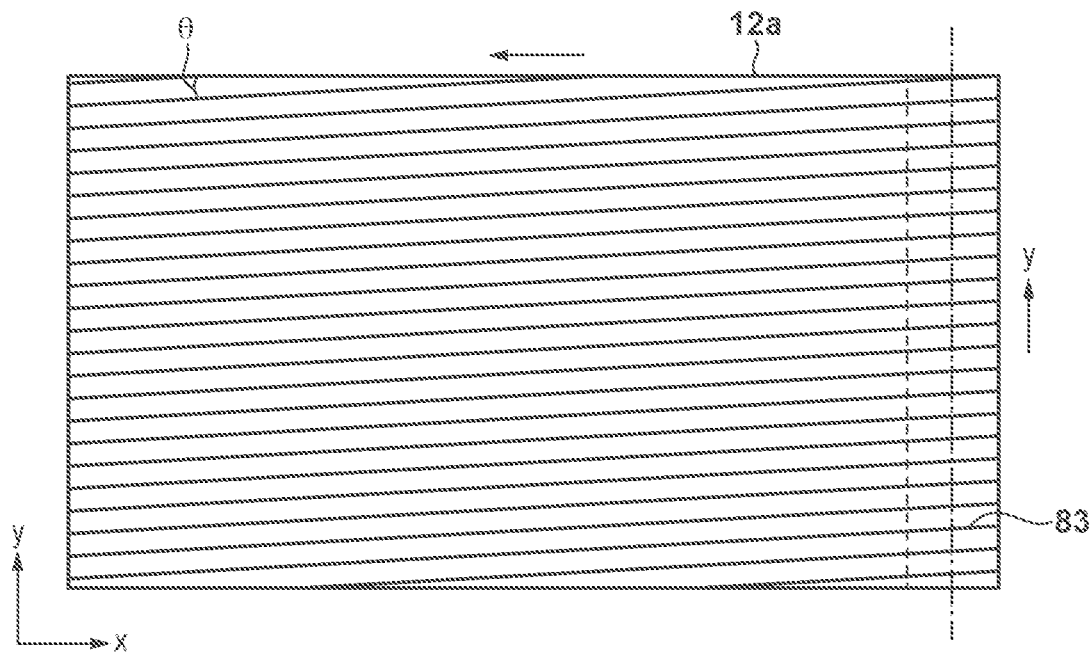
FIGS. 5A and 5B are diagrams illustrating grooves in the intermediate transfer belt.

In FIG. 4A, the grooves 83 are formed substantially parallel with the y direction. Furthermore, the grooves 83 are formed in continuous, substantially straight lines in the circumferential direction (rotation direction) of the intermediate transfer belt 12a. However, the grooves 83 may extend in any direction that is parallel to a direction intersecting with the y direction. As illustrated in FIG. 5A, the direction in which the grooves 83 extend may be at an angle to the transport direction of the intermediate transfer belt 12a. This angle θ is, for example, less than or equal to 45 degrees, and more specifically, less than or equal to 10 degrees. Typically, θ can be set to substantially zero. The grooves 83 having the angle θ may be formed using a mold having a convex portion formed at an angle to the rotation direction of a cylinder that forms the mold. The grooves 83 may be formed by holding the mold, which has a convex portion formed substantially parallel to the rotation direction of the cylinder that forms the mold, at an angle relative to the x direction.

6. Diffraction Phenomenon

Figure 5B:
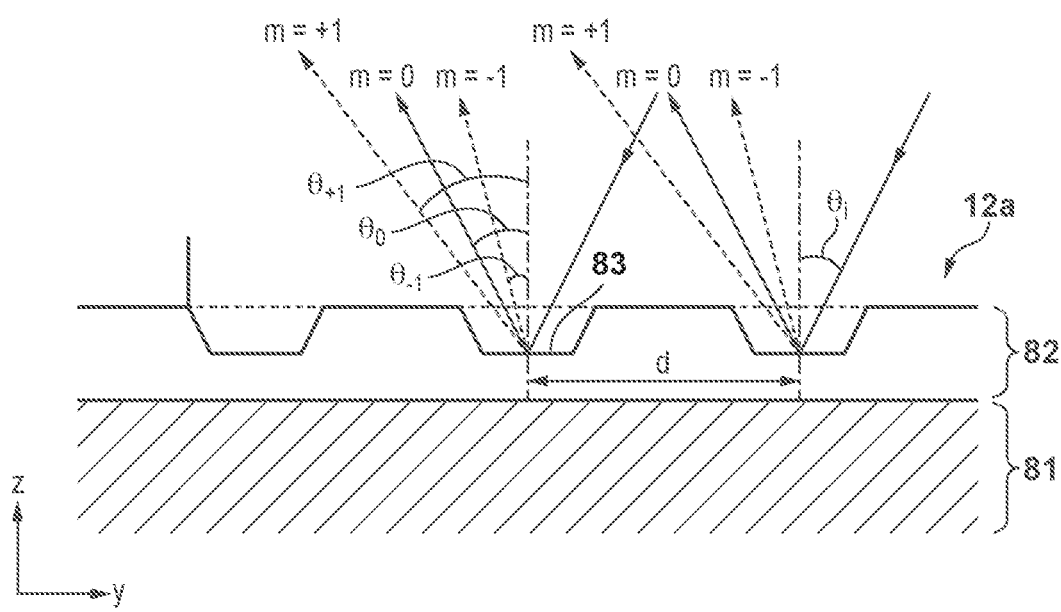

FIG. 5B illustrates a diffraction phenomenon caused by a reflective diffraction grating. In general, the equation for finding a diffraction angle from a reflective diffraction grating is expressed by Equation 1 below.

$$d[\sin(\theta i)+\sin(\theta m)]=m\lambda \quad \text{Equation 1}$$

d represents the diffraction grating interval. λ represents the wavelength of the light ray. θi represents the incident angle of the light ray with respect to the normal direction of the diffraction grating. θm represents the reflection angle (diffraction angle). m represents the diffraction order (a positive or negative integer of m=±0, ±1, ±2, and so on). When m=0 (i.e., regular reflection), θi=θm=0. Accordingly, for regularly-reflected light, the grating interval d and the light ray wavelength λ do not affect the diffraction angle. For other orders, depending on the interval d and the light ray wavelength λ, instances of reflected light intensify each other at a diffraction angle θm such that an optical path difference between the instances of reflected light is an integral multiple of the wavelength. Expanding Equation 1 for the diffraction angle θm results in Equation 2 below.

$$\sin\theta m=m\lambda/d-\sin\theta i \quad \text{Equation 2}$$

The following trends occur when the incident angle relative to the normal line of a target surface to be irradiated is defined as negative (minus). However, the incident angle may also be defined as m>0.

The greater the absolute value of the incident angle θi is, the greater the right-hand side of Equation 2 becomes, and the greater the diffraction angle θm becomes.

The greater the light ray wavelength λ is, the greater the right-hand side of Equation 2 becomes, and the greater the diffraction angle θm becomes.

The smaller the grating interval d is, the greater the right-hand side of Equation 2 becomes, and the greater the diffraction angle θm becomes. In the intermediate transfer belt 12a, the average interval d of the grooves 83 formed in the surface corresponds to the grating interval d. Accordingly, light from the light-emitting element of the optical sensor 31 is diffracted by the plurality of grooves 83.

7. Scattering Characteristics of Intermediate Transfer Belt

Figure 6A:
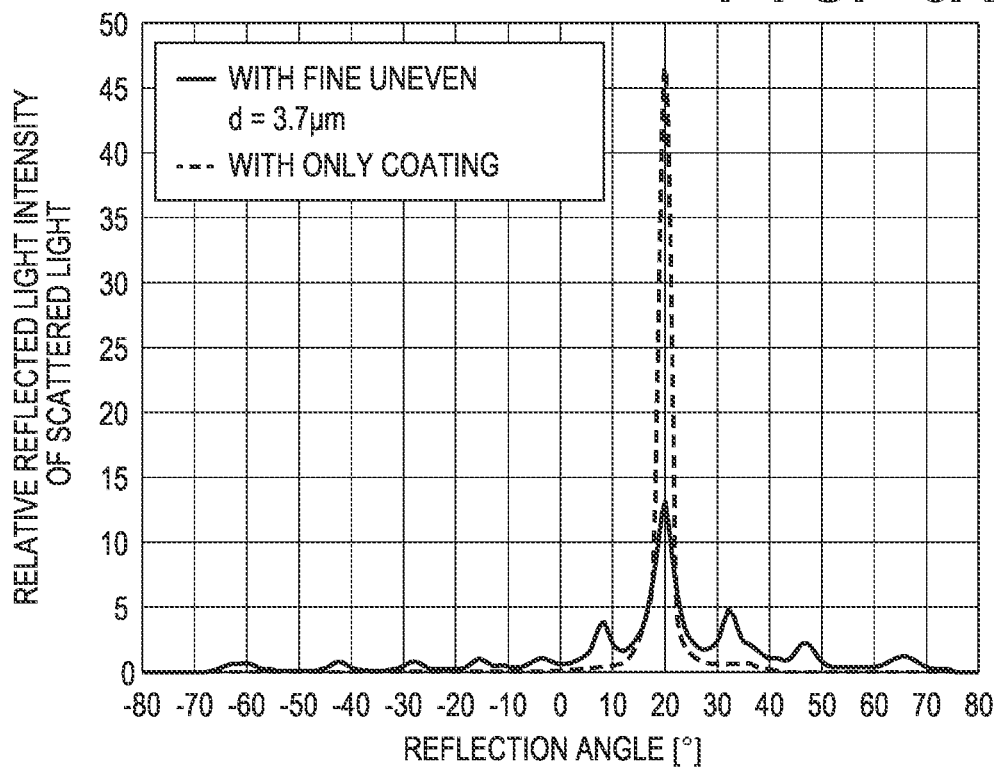
FIGS. 6A and 6B are graphs illustrating BRDF.

FIG. 6A is a graph showing angular distribution characteristics of scattered light (hereinafter referred to as "BRDF", an acronym for "bi-directional reflectance distribution function"). The vertical axis represents a relative reflected light intensity of the scattered light. The horizontal axis represents a reflection angle. The solid line represents the BRDF obtained by irradiating the surface of the intermediate transfer belt 12a, in which the plurality of grooves 83 (uneven shapes) with an interval d of 3.7 μm are formed, with light of λ=622 nm at an incident angle of −20°. The BRDF is measured using Mini-Diff V1, a compact and simple scattering measurement device manufactured by Cybernet Systems Co., Ltd. In FIG. 6A, an intermediate transfer belt 12a having only an acrylic resin coating, with no fine uneven shapes on its surface (hereinafter referred to as a "coated belt"), is used as a comparative example. The broken line represents the BRDF of the comparative example.

As can be seen from FIG. 6A, the BRDF of the coated belt has a diffuse reflection component which spreads broadly with respect to the peak of regularly-reflected light. In contrast, with the BRDF of the intermediate transfer belt 12a in which fine uneven shapes are formed, a diffraction phenomenon occurs in which the amount of 0th-order regularly-reflected light is reduced and the amount of reflected light increases at regular angles. The intensity of the diffracted light decreases as the order m increases.

Diffuse reflection components are generated in the vicinity of each order of diffracted light of the BRDF of the intermediate transfer belt 12a, in which uneven shapes are formed. As such, the diffuse reflection component of the BRDF of the intermediate transfer belt 12a, in which uneven shapes are formed, is much stronger than the diffuse reflection component of the BRDF of the coated belt.

8. Configuration of Toner Sensor

Figure 7A:
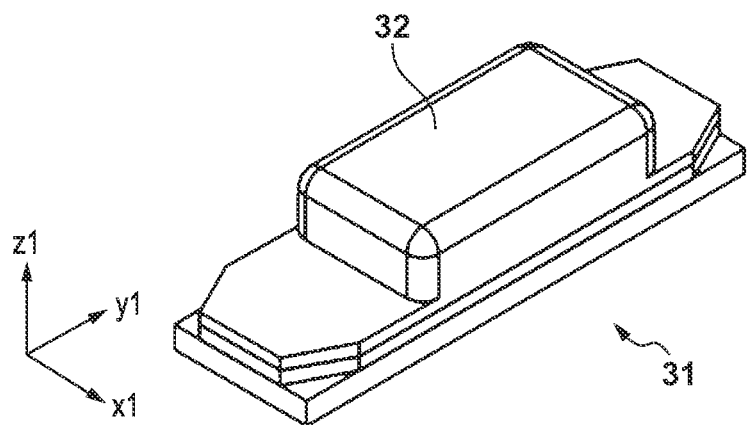
FIGS. 7A and 7B are diagrams illustrating an optical sensor.
Figure 7B:
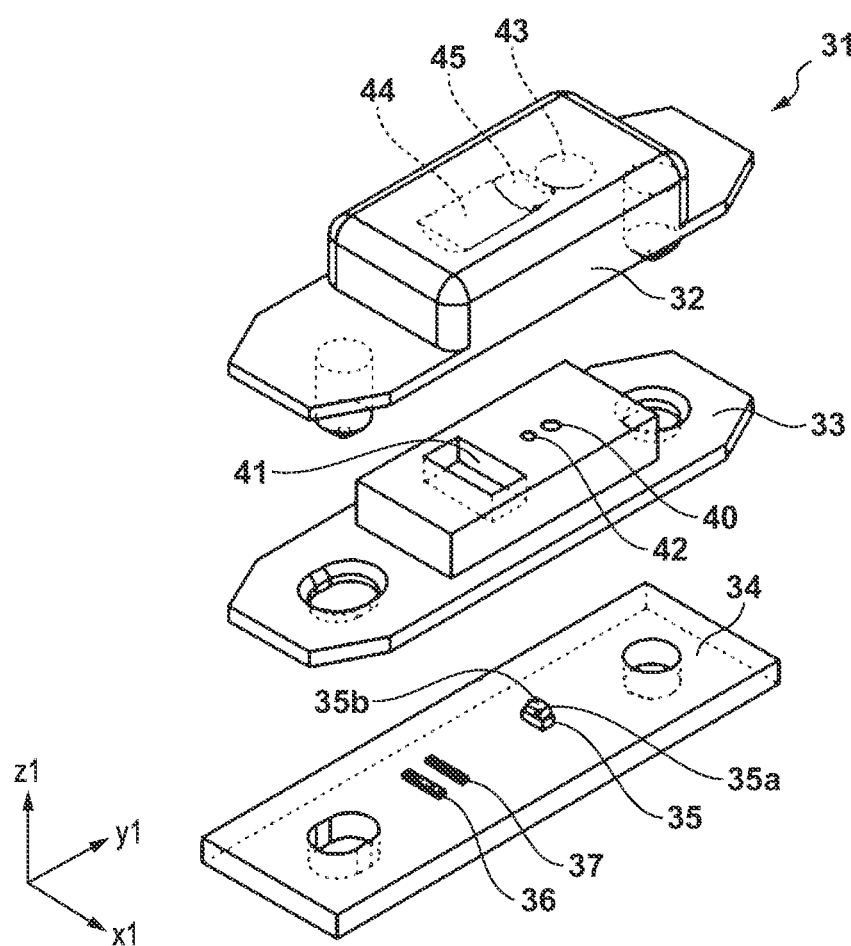

FIG. 7A is a schematic perspective view of the optical sensor 31. FIG. 7B is an exploded perspective view of the constituent components of the optical sensor 31. x, y, and z are directions based on the image forming apparatus 100, while x1, y1, and z1 are directions based on the optical sensor 31. The x1 direction is the shorter direction of the optical sensor 31. In the first embodiment, the x direction and the x1 direction are non-parallel. The y1 direction is the longer direction of the optical sensor 31. In the first embodiment, the y direction and the y1 direction are parallel. The z1 direction is a height direction of the optical sensor 31 (a normal direction of a circuit board 34). In the first embodiment, the z direction and the z1 direction are non-parallel.

FIG. 8 is a cross-sectional view of an optical path taking the x1 direction as a sight direction. In other words, FIG. 9 illustrates a cut plane passing through the rotation axis of the drive roller 12b and the center of an LED 35. FIG. 9A is a cross-sectional view illustrating an irradiated region 47 where diffused reflection light is produced, when the y direction is viewed as the sight direction. FIG. 9B is a schematic cross-sectional view illustrating an irradiated region 50 where regularly-reflected light is produced, when the y direction is viewed as the sight direction. These cross-sections are cut planes parallel to a height direction and a shorter direction of the optical sensor 31, and correspond to cut planes that take the y direction as a normal line.

The optical sensor 31 is disposed so as to face the surface of a substantially cylindrical shape formed by the intermediate transfer belt 12a wrapping around the drive roller 12b. As illustrated in FIGS. 7A and 7B, the optical sensor 31 includes a cover member 32, a housing 33, and the circuit board 34. The LED 35, which is a light-emitting element, a first light receiving unit 36, and a second light receiving unit 37 are mounted on the circuit board 34. A straight line connecting the center of the mounting position of the LED 35, the center of the mounting position of the first light receiving unit 36, and the center of the mounting position of the second light receiving unit 37 is substantially parallel to the rotation axis of the drive roller 12b.

As illustrated in FIG. 7B, the LED 35 includes a light-emitting chip 35a enclosed within a light transmitting member 35b. The light transmitting member 35b is a member which is light-transmissive (e.g., resin or glass). Light emitted from the light-emitting chip 35a is scattered at a boundary surface of the light transmitting member 35b, and as a result, light is emitted from substantially the entire surface of the light transmitting member 35b.

Some of the light emitted from the LED 35 is reflected by the surface of the intermediate transfer belt 12a and becomes diffused reflection light, which is detected by the first light receiving unit 36. Some of the light emitted from the LED 35 is reflected by the surface of the intermediate transfer belt 12a and becomes regularly-reflected light, which is detected by the second light receiving unit 37. In other words, the first light receiving unit 36 includes a plurality of light-receiving elements that receive diffused reflection light. Likewise, the second light receiving unit 37 includes a plurality of light-receiving elements that receive regularly-reflected light. The pluralities of light-receiving elements are aligned so as to be parallel to the shorter direction of the circuit board 34 (the x1 direction). For example, 16 of each of the light-receiving elements are provided. By configuring the first light receiving unit 36 and the second light receiving unit 37 with a plurality of light-receiving elements in this manner, the reflected light can be sufficiently detected even if the cylindrical surface of the drive roller 12b and the optical sensor 31 are misaligned within a tolerance range.

As illustrated in FIG. 7B, a first opening 40, a second opening 41, and a third opening 42 are provided in a top surface of the housing 33. The first opening 40 forms part of a light guide path through which the light from the LED 35 to the intermediate transfer belt 12a passes. The second opening 41 forms part of a light guide path through which the reflected light from the intermediate transfer belt 12a to the first light receiving unit 36 and the second light receiving unit 37 passes. The third opening 42 forms part of a light guide path through which the light from the LED 35 to the intermediate transfer belt 12a passes. The housing 33 may be provided with a light-shielding wall 38. The light-shielding wall 38 prevents light from the LED 35 from being directly incident on the first light receiving unit 36 and the second light receiving unit 37.

A first lens unit 43, a second lens unit 44, and a third lens unit 45 may be provided on a rear side of the cover member 32 (the side where the housing 33 is disposed). The first lens unit 43 functions so that the light passing through the first opening 40 forms a desired spot on the target surface to be irradiated. The second lens unit 44 functions so that the diffused reflection light from the intermediate transfer belt 12a forms an image on the first light receiving unit 36 and the regularly-reflected light from the intermediate transfer belt 12a forms an image on the second light receiving unit 37. The third lens unit 45 functions so that the light passing through the third opening 42 forms a desired spot on the target surface to be irradiated. The first lens unit 43, the second lens unit 44, and the third lens unit 45 may be provided as individual units, or may be provided as a single integrated unit.

9. Optical Path for Detecting Diffused Reflection Light

In FIG. 8, the y direction and the y1 direction are parallel to the width direction of the intermediate transfer belt 12a. Accordingly, the direction in which the grooves 83 extend is parallel to the depth direction of the drawing. In FIG. 9A, the transport direction of the part of the intermediate transfer belt 12a which is not in contact with the drive roller 12b is parallel to the x direction. The direction in which the grooves 83 extend is also parallel to the x direction.

As illustrated in FIGS. 8 and 9A, the light output from the LED 35 passes through the first opening 40 and is incident on the first lens unit 43. The light incident on the first lens unit 43 passes through a flat part 32a, which is part of the top surface of the cover member 32, and is incident on the surface of the intermediate transfer belt 12a. This incident light will be referred to as first irradiation light 46. As illustrated in FIGS. 8 and 9A, the irradiated region 47 is a region irradiated with the first irradiation light 46 in order to detect diffused reflection light.

The housing 33 is constituted by a black resin. This reduces stray light. The cover member 32 is constituted by a transparent resin (a resin which transmits light). The refractive index of the cover member 32 is different from the refractive index of spaces in front of and behind the cover member 32. As such, the irradiated region 47 is irradiated with the first irradiation light 46 after the first irradiation light 46 has been refracted by the surface of the first lens unit 43 and the flat part 32a. The material of the cover member 32 is set to, for example, polystyrene having a refractive index of 1.59. The lens radius of the first lens unit 43 is designed so that the light-emitting chip 35a is disposed at the focal point of the first lens unit 43. As such, the first irradiation light 46 incident on the first lens unit 43 becomes substantially parallel light with which the intermediate transfer belt 12a is irradiated.

As illustrated in FIG. 8, the first opening 40 and the first lens unit 43 are disposed at positions shifted to the right (the +y1 direction) of a vertical line extending from the LED 35 to the rotation axis of the drive roller 12b. Note that the vertical line is parallel to the normal line of the circuit board 34. The first irradiation light 46 is also a light ray which advances in a direction slanted to the right relative to this vertical line. As illustrated in FIG. 8, an irradiation angle θD1 is defined here. The irradiation angle θD1 of the first irradiation light 46 is −25°, for example. Although the irradiation angle is defined as negative and the reflection angle is defined as positive here, the positive and negative signs will be omitted when focusing on the magnitudes of the angles.

As illustrated in FIG. 9A, the first opening 40 and the first lens unit 43 are disposed at positions shifted to the right of the vertical line of the LED 35. In FIG. 9A, "right" is the direction parallel to the shorter direction of the circuit board 34 (the +x1 direction). As a result, in FIG. 9A too, the first irradiation light 46 is also a light ray slanted to the right. As illustrated in FIG. 9A, an irradiation angle θD2 is defined. The irradiation angle θD2 of the first irradiation light 46 is −11.5°, for example.

As illustrated in FIG. 8, a first light-receiving region 48, which is a range in which the first light receiving unit 36 can receive reflected light, is a range extending from a point 48a to a point 48b. The point 48a is a point obtained by extending a line connecting a left corner 36a of the first light receiving unit 36 and an upper-right corner 41b of the second opening 41 along the light guide path. The point 48b is a point obtained by extending a line connecting a right corner 36b of the first light receiving unit 36 and a lower-left corner 41c of the second opening 41 along the light guide path.

As illustrated in FIG. 9A, a first light-receiving region 48', in which the first light receiving unit 36 can receive light, is a range extending from a point 48c to a point 48d. The point 48c is a point obtained by extending a line connecting a left corner 36c of the first light receiving unit 36 and an upper-right corner 41f of the second opening 41 along the light guide path. The point 48d is a point obtained by extending a line connecting a right corner 36d of the first light receiving unit 36 and an upper-left corner 41e of the second opening 41 along the light guide path. Because the second lens unit 44 is cylindrical in shape, a surface of this cylinder is indicated as an arc in FIG. 9A. The dimensions of the second opening 41 illustrated in FIG. 8 and the dimensions of the second opening 41 illustrated in FIG. 9A are different. As such, the dimension of the first light-receiving region 48 indicated in FIG. 8 and the dimension of the first light-receiving region 48' illustrated in FIG. 9A are different.

As illustrated in FIG. 8, the first irradiated region 47 is smaller than the first light-receiving region 48. As such, the detection range of the first light receiving unit 36 actually corresponds to the first irradiated region 47. In other words, the first light receiving unit 36 for detecting diffused reflection light detects diffused reflection light from the first irradiated region 47.

10. Optical Path for Detecting Regularly-Reflected Light

As illustrated in FIGS. 8 and 9B, the third opening 42 is provided in the housing 33 for the purpose of irradiating the intermediate transfer belt 12a with light. Additionally, the third lens unit 45 is provided in the cover member 32 for the purpose of irradiating the intermediate transfer belt 12a with light separately from the first lens unit 43. The light output from the LED 35 passes through the third opening 42 and is incident on the third lens unit 45. The light incident on the third lens unit 45 passes through the flat part 32a provided in the top surface of the cover member 32 and is incident on the surface of the intermediate transfer belt 12a. This incident light will be referred to as second irradiation light 49. The second irradiated region 50 is a region irradiated with the second irradiation light 49 in order to detect regularly-reflected light. The lens radius of the third lens unit 45 is designed so that the light-emitting chip 35a is disposed at the focal point of the third lens unit 45. As such, the second irradiation light 49 incident on the third lens unit 45 becomes substantially parallel light with which the intermediate transfer belt 12a is irradiated.

As illustrated in FIG. 8, the third opening 42 and the third lens unit 45 are disposed at positions shifted to the left (the −y direction) of the aforementioned vertical line for the LED 35. In FIG. 8, the second irradiation light 49 is a light ray slanted to the left relative to this vertical line. Here, the irradiation angle of the second irradiation light 49 is defined as θS1. The irradiation angle θS1 of the second irradiation light 49 is, for example, −19.1°.

In FIG. 9B, the third opening 42 and the third lens unit 45 are disposed directly above the LED 35. Accordingly, the second irradiation light 49 is a light ray that travels in what is substantially the normal direction of the target surface to be irradiated (the irradiation angle θS2≈0°). In other words, the second irradiated region 50 and the first irradiated region 47 are different regions.

As illustrated in FIG. 8, a second light-receiving region 51, which is a range in which the second light receiving unit 37 can receive reflected light, is a range extending from a point 51a to a point 51b. The point 51a is a point obtained by extending a line connecting a left corner 37a of the second light receiving unit 37 and a lower-right corner 41d of the second opening 41. The point 51b is a point obtained by extending a line connecting a right corner 37b of the second light receiving unit 37 and an upper-left corner 41a of the second opening 41.

On the other hand, a second light-receiving region 51' in the belt transport direction A indicated in FIG. 9B, in which the second light receiving unit 37 can receive light, is a range from a point 51c to a point 51d. The point 51c is a point obtained by extending a line connecting a left corner 37c of the second light receiving unit 37 and the upper-right corner 41f of the second opening 41 along the light guide path. The point 51d is a point obtained by extending a line connecting a right corner 37d of the second light receiving unit 37 and the upper-left corner 41e of the second opening 41 along the light guide path.

As illustrated in FIGS. 8 and 9B, the dimensions of the second irradiated region 50 are smaller than the dimensions of the second light-receiving regions 51 and 51'. As a result, the substantial range over which the second light receiving unit 37 can detect light is the second irradiated region 50. In other words, the second light receiving unit 37 detects regularly-reflected light from the second irradiated region 50.

11. Diffracted Light from Toner Sensor Irradiation Light

Figure 10:
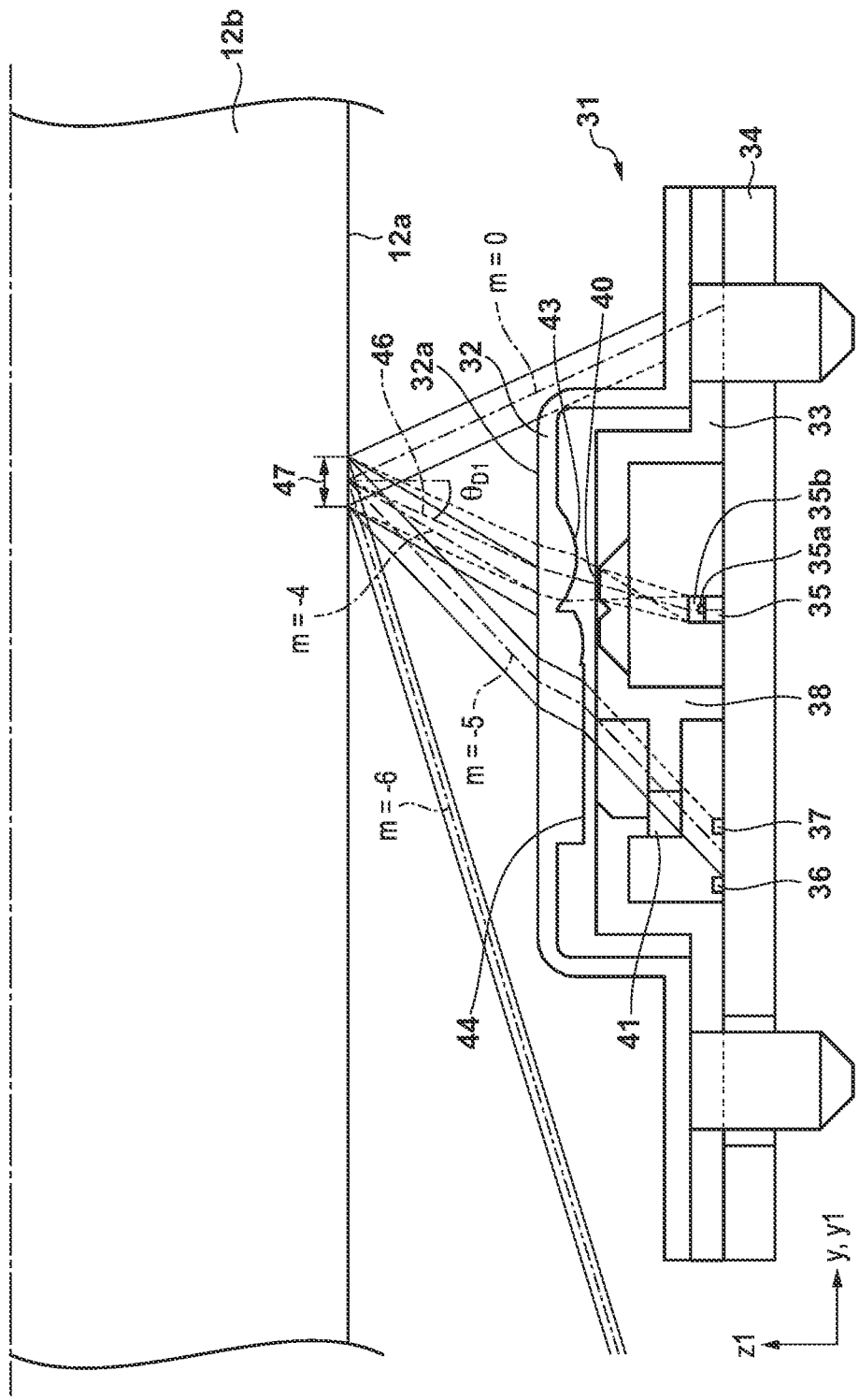
FIG. 10 is a diagram illustrating diffracted light of various orders.
Figure 12A:
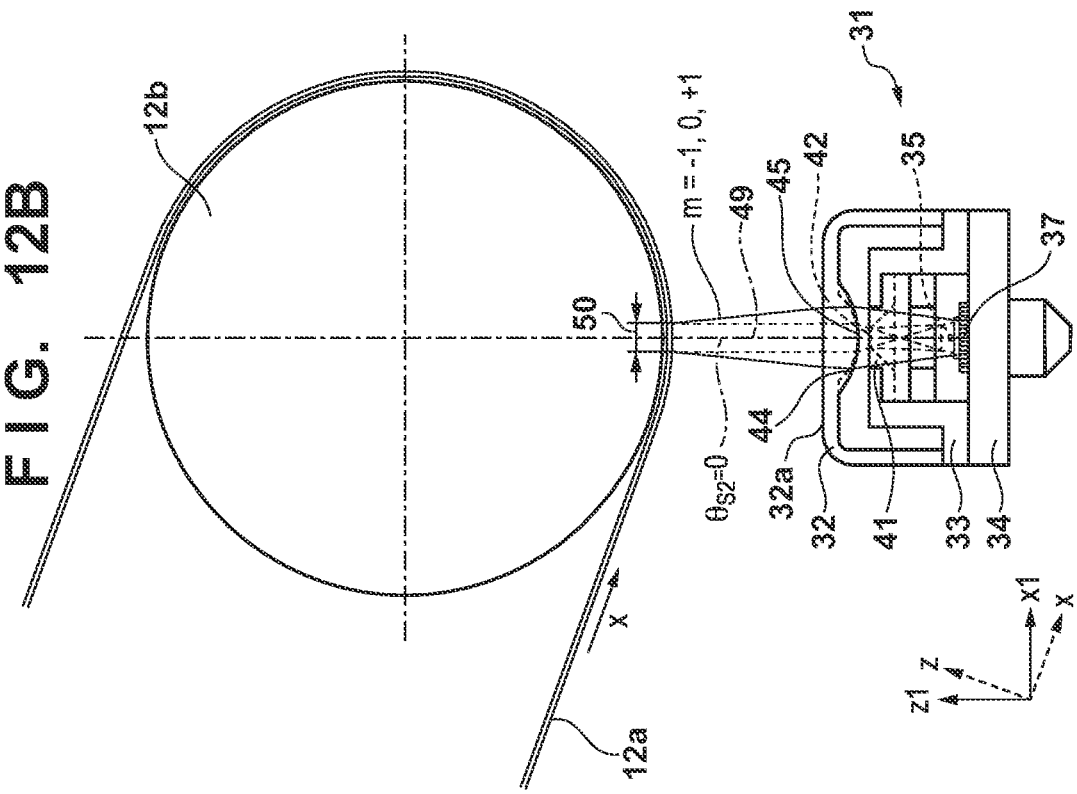
FIGS. 12A and 12B are diagrams illustrating diffracted light of various orders.
Figure 12B:
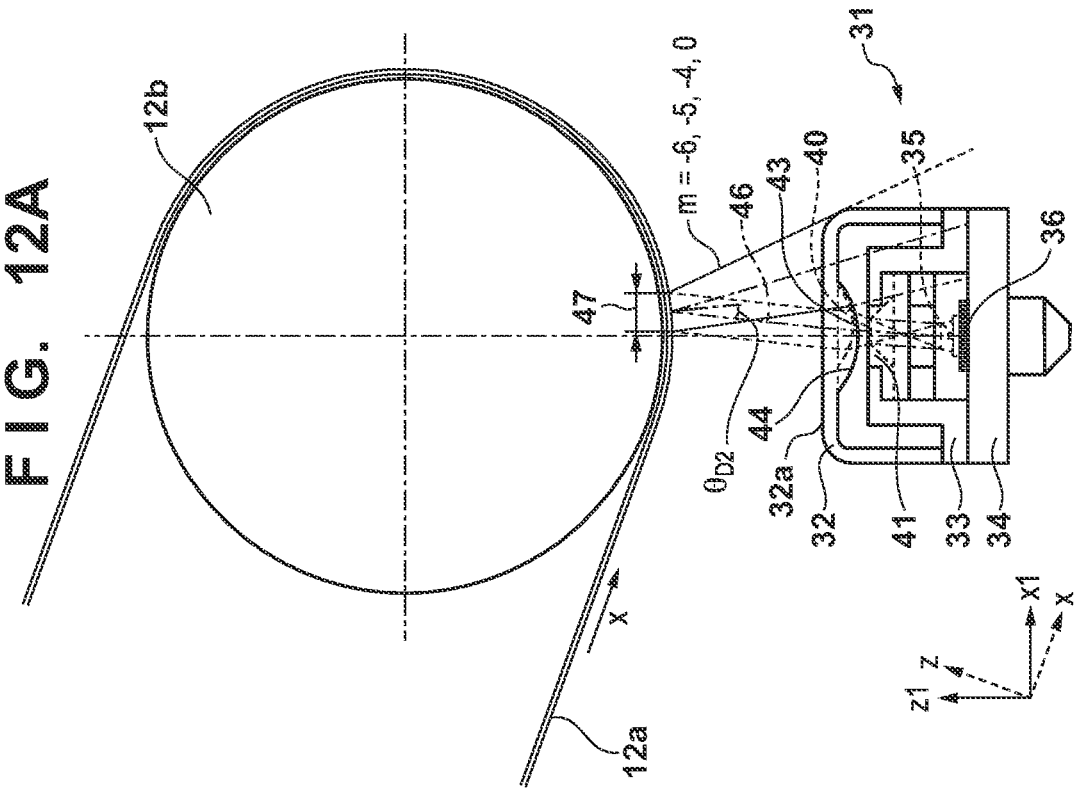

FIG. 10 illustrates an optical path of diffracted light of the first irradiation light 46, seen from the downstream side of the transport direction of the intermediate transfer belt 12a. FIG. 11 illustrates an optical path of diffracted light of the second irradiation light 49, seen from the downstream side of the transport direction of the intermediate transfer belt 12a. FIG. 12A illustrates diffracted light of the first irradiation light 46 as seen from the width direction of the intermediate transfer belt 12a. FIG. 12B illustrates diffracted light originating from the second irradiation light 49 as seen from the width direction of the intermediate transfer belt 12a. The interval d of the grooves 83 of the intermediate transfer belt 12a is 3.7 µm, and a wavelength λ of the LED 35 is 850 nm.

For the diffracted light of the first irradiation light 46 detected by the first light receiving unit 36, an mth-order diffraction angle is expressed by Equation 2. The table illustrated in FIG. 13A is obtained by substituting an irradiation angle θi of the diffracted light produced by the first irradiation light 46, indicated in FIG. 10, for θD1 (θD1 is) −25°. As illustrated in FIGS. 10 and 13A, the diffracted light moving toward positions near the first light receiving unit 36 is −6th-order, −5th-order, and −4th-order diffracted light.

On the other hand, the diffraction angle of the diffracted light of the first irradiation light 46, indicated in FIG. 12A, is also calculated by substituting the irradiation angle θi for θD2 in Equation 2 (θD2=−11.5°). As a result, the diffraction angles of the diffracted light are both angles near +11.5°. This makes it less likely that the diffracted light will enter into the second opening 41.

As illustrated in FIGS. 11 and 12B, the second irradiation light 49 related to the second light receiving unit 37 is tilted (at an irradiation angle θS) relative to the vertical line in FIG. 11, but is parallel to the vertical line in FIG. 12B. From Equation 2, when the diffraction angles are calculated for m=−1, 0, and +1 (where θS1=−19.1°), the diffraction angles indicated in FIGS. 11 and 13B are obtained.

The diffracted light of the second irradiation light 49, indicated in FIG. 12B, is also calculated by substituting the irradiation angle θi for θS2 in Equation 2 (θS2=0°). As a result, the diffraction angles of the diffracted light are both angles near 0°.

12. Optical Sensor Detection Performance

The performance of the optical sensor 31 according to the present embodiment and the performance of an optical sensor according to a comparative example will be described in order to facilitate understanding of the effects of the present embodiment. FIGS. 14, 15, 16A, and 16B illustrate an optical sensor 31' according to the comparative example. Note that FIGS. 14, 15, 16A, and 16B, which illustrate the comparative example, correspond to FIGS. 10, 11, 12A, and 12B, which illustrate the embodiment, respectively. Elements that are common or similar in both the embodiment and the comparative example are given the same reference signs and will not be described. In the embodiment and the comparative example, the shape of the grooves 83 in the intermediate transfer belt 12a and the light ray wavelength of the LED 35 are the same.

The way in which the optical sensor 31' according to the comparative example differs from the optical sensor 31 according to the embodiment is illustrated in FIG. 16A. This difference is that in the comparative example, the intermediate transfer belt 12a is irradiated with the first irradiation light 46 in substantially the normal direction of the circuit board 34 (toward the rotation axis of the drive roller 12b) (with the irradiation angle θD2≈0°). In other words, in the comparative example, the first opening 40 and the first lens unit 43 are disposed so that the irradiation angle θD2≈0°. As described with reference to FIG. 6A, diffuse reflection components are present in the vicinity of the diffracted light. Accordingly, even if the first light receiving unit 36 is disposed away from the diffracted light, the diffuse reflection component produced in the vicinity of the diffracted light will be incident on the first light receiving unit 36. As a result, in the comparative example, the toner detection performance drops drastically.

Figure 14:
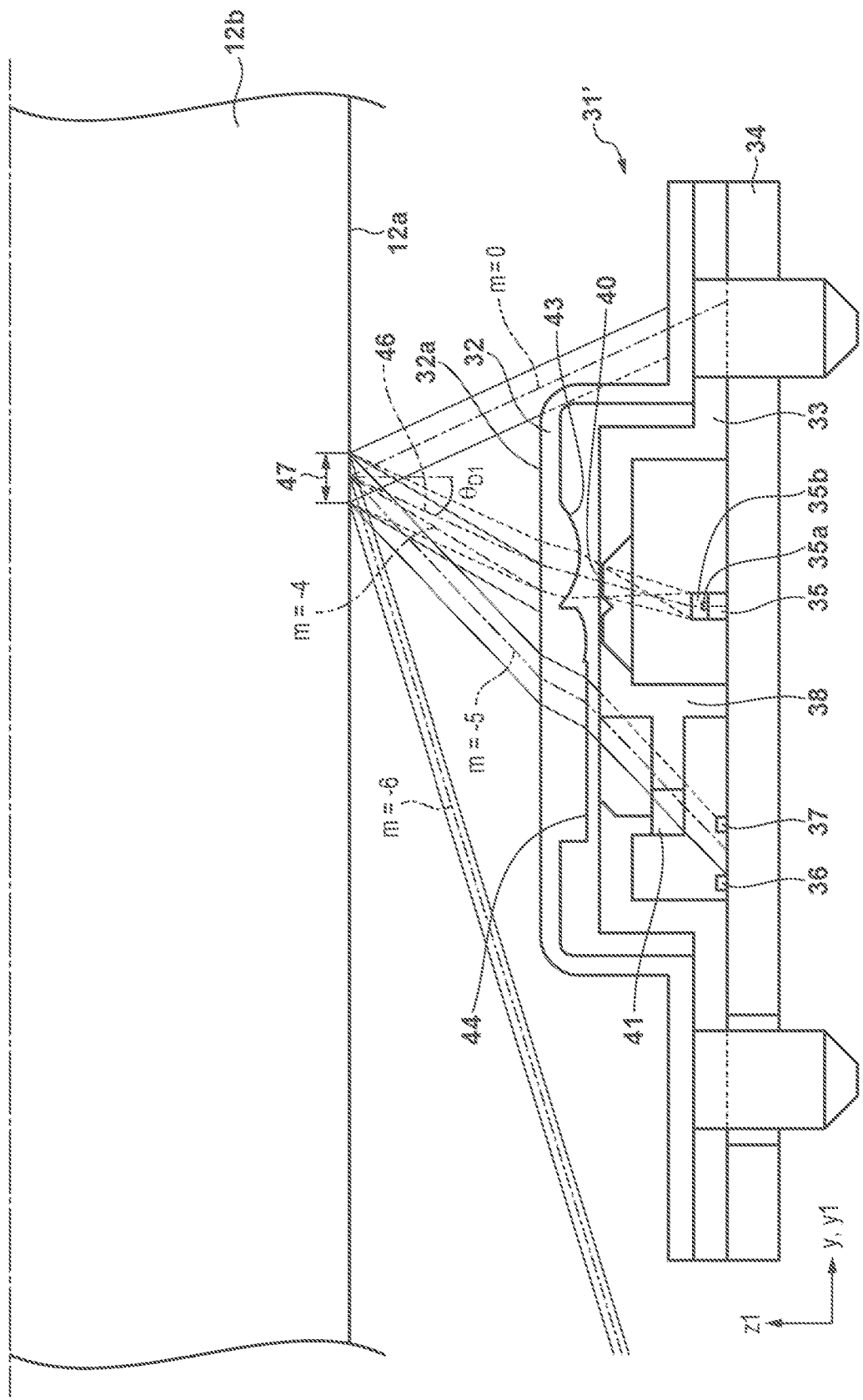
FIG. 14 is a diagram illustrating diffracted light of various orders according to a comparative example.

To be more specific, as illustrated in FIG. 16A, the irradiation direction and the normal direction of the target surface to be irradiated are parallel, and thus −5th-order diffracted light is incident near the first light receiving unit 36, as illustrated in FIG. 14. Accordingly, diffuse reflection components produced in the vicinity of the diffracted light are incident on the first light receiving unit 36, and the toner detection performance drops drastically.

On the other hand, the irradiation angle θD2 of the first irradiation light 46 of the optical sensor 31 illustrated in FIG. 12A is −11.5°. As such, the diffuse reflection components produced in the vicinity of the diffracted light are less likely to be incident on the first light receiving unit 36. The optical sensor 31 according to the embodiment therefore has excellent toner detection performance.

FIG. 17A illustrates an output value of the first light receiving unit 36 of the optical sensor 31 according to the embodiment. FIG. 17B illustrates an output value of the first light receiving unit 36 of the optical sensor 31' according to the comparative example. These drawings illustrate test patterns 30 having optical densities of 20%, 40%, 60%, 80%, and 100% being detected by the optical sensors 31 and 31'. As described above, the first light receiving unit 36 is a light receiving unit that detects diffused reflection light from the toner.

The optical sensor 31 according to the embodiment uses a configuration that avoids regularly-reflected light and diffracted light from the intermediate transfer belt 12a. As illustrated in FIGS. 17A and 17B, an output value 60 of the optical sensor 31 obtained when the surface of the intermediate transfer belt 12a is detected is lower than the output value 60 obtained in the case of optical sensor 31'. Accordingly, a difference 61 between the output value when the test pattern 30 with 100% density is detected and the output value 60 when the intermediate transfer belt 12a is detected increases. Accordingly, the optical sensor 31 can accurately detect the diffused reflection light from the toner.

On the other hand, the optical sensor 31' according to the comparative example detects a large amount of the diffuse reflection components produced in the vicinity of the diffracted light from the intermediate transfer belt 12a. As illustrated in FIG. 17B, the output value 60 is relatively high when the intermediate transfer belt 12a is detected. The difference 61 therefore becomes relatively small. Accordingly, the optical sensor 31' according to the comparative example cannot detect the diffused reflection light from the toner as accurately as the configuration according to the first embodiment.

13. Effects of First Embodiment

The irradiation direction of the first irradiation light 46 is slanted from the normal line of the target surface to be irradiated in both the transport direction and the width direction of the intermediate transfer belt 12a. As a result, the detection performance of the first light receiving unit 36 is improved. Because the regularly-reflected light originating from the first irradiation light 46 in both the transport direction and the width direction of the intermediate transfer belt 12a travels away from the first light receiving unit 36, the detection performance of the first light receiving unit 36 is improved.

There are two main reasons why the detection performance of the first light receiving unit 36 in the first embodiment is improved. The first reason is that the first irradiation light 46 is diffracted in the width direction of the intermediate transfer belt 12*a* by the grooves 83. In the transport direction, the irradiation direction of the first irradiation light 46 is slanted relative to the normal line of the target surface to be irradiated, and thus the diffracted light travels away from the second opening 41 and the second lens unit 44. The second reason is that the first irradiation light 46 travels toward a position shifted from the rotation axis of the cylindrically-shaped drive roller 12*b*. This causes the tangent plane of the target region to be irradiated to slant. As a result, the regularly-reflected light and diffracted light of the first irradiation light 46 travel away from the second opening 41 and the second lens unit 44.

Figure 18:
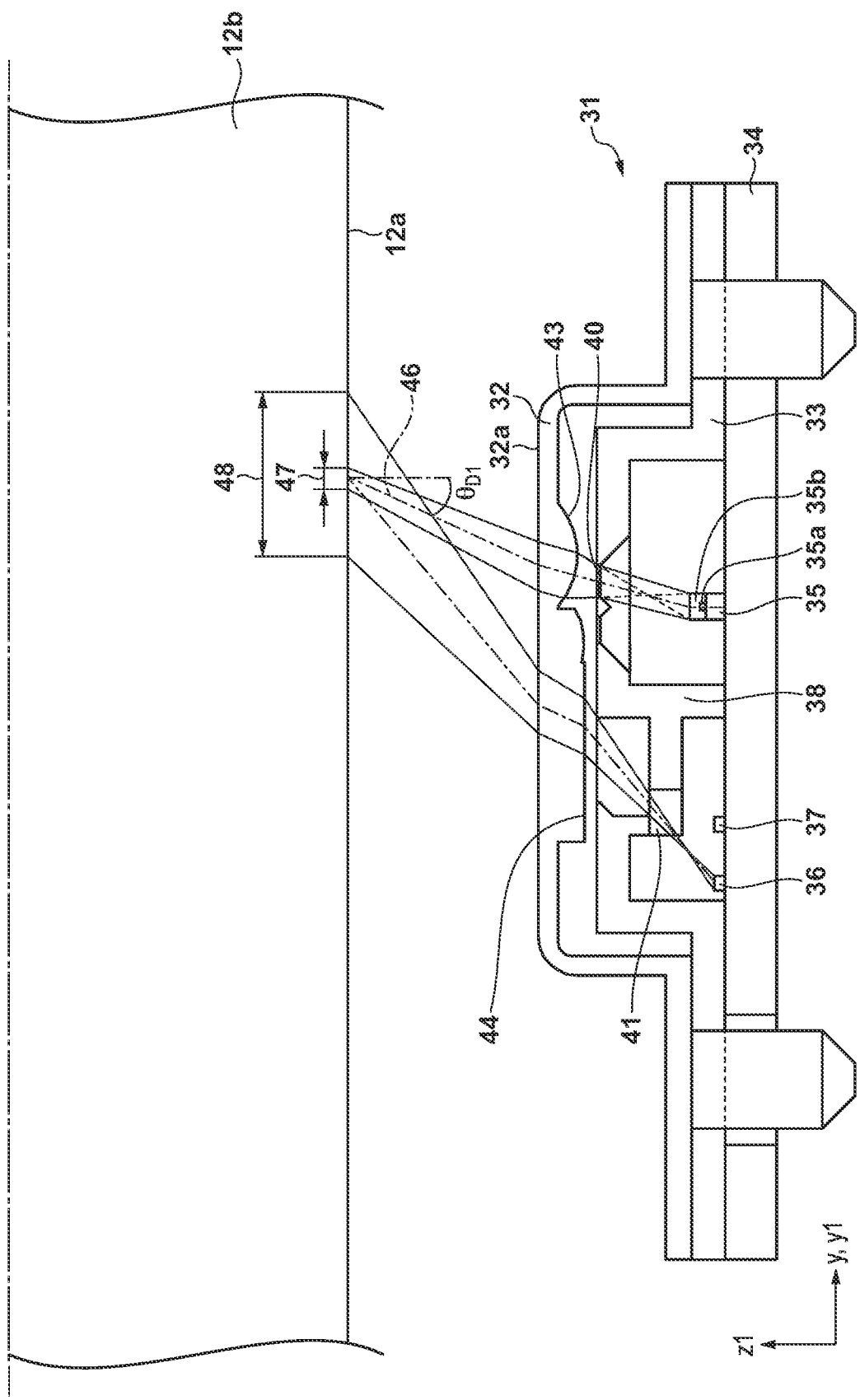
FIG. 18 is a diagram illustrating an optical path for a convergent optical system.
Figure 19:
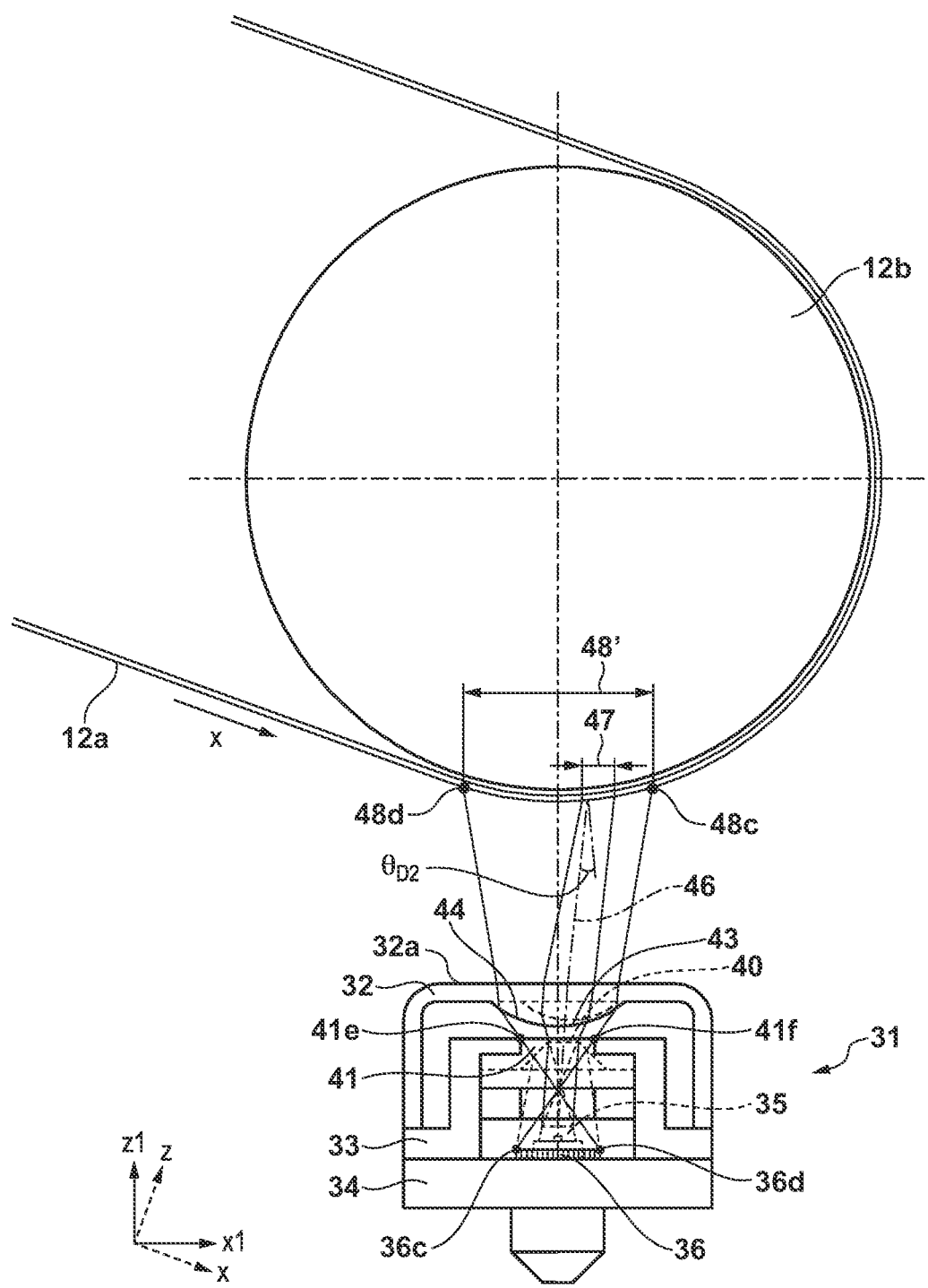
FIG. 19 is a diagram illustrating an optical path for a convergent optical system.
Figure 20:
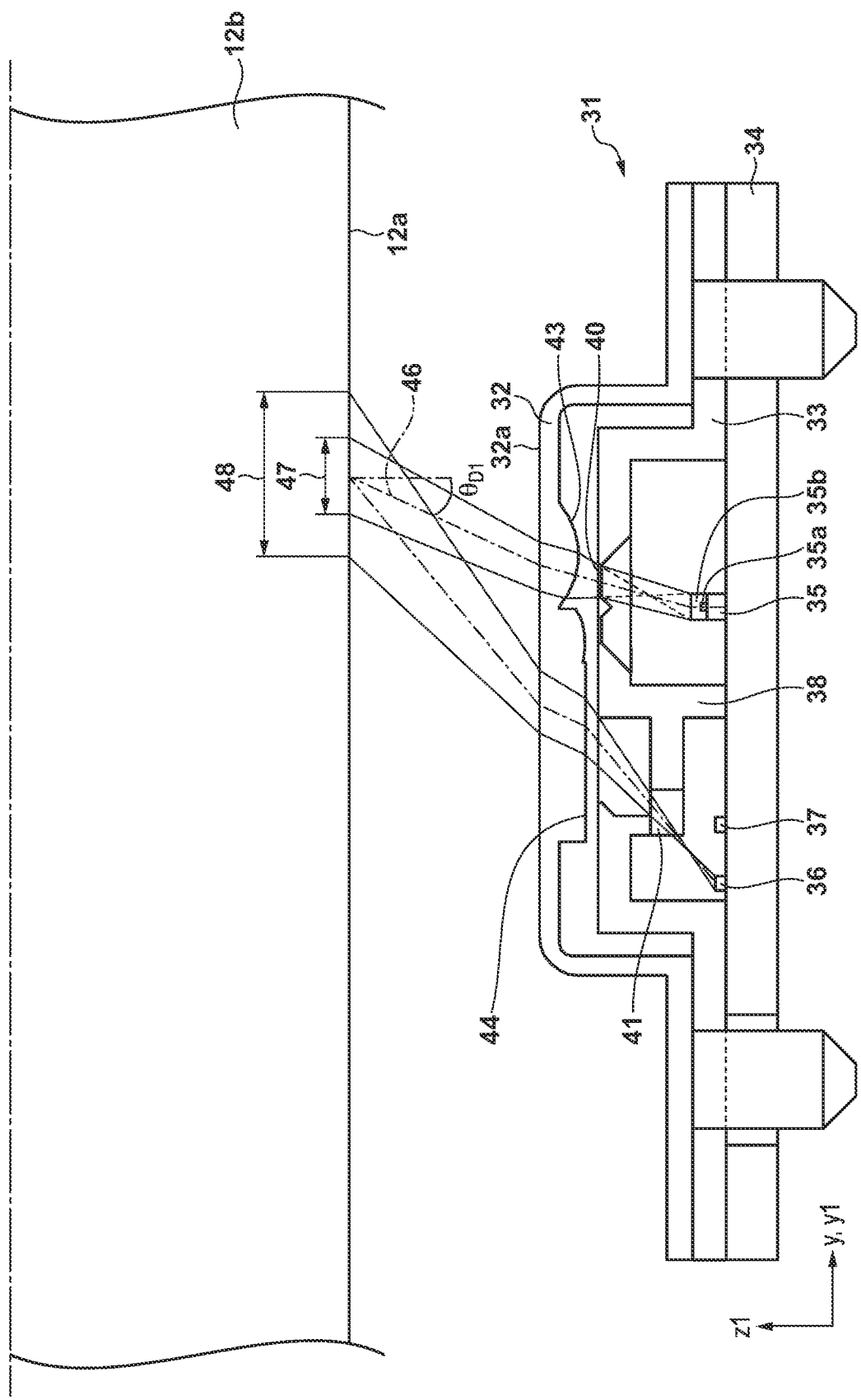
FIG. 20 is a diagram illustrating an optical path for a divergent optical system.
Figure 21:
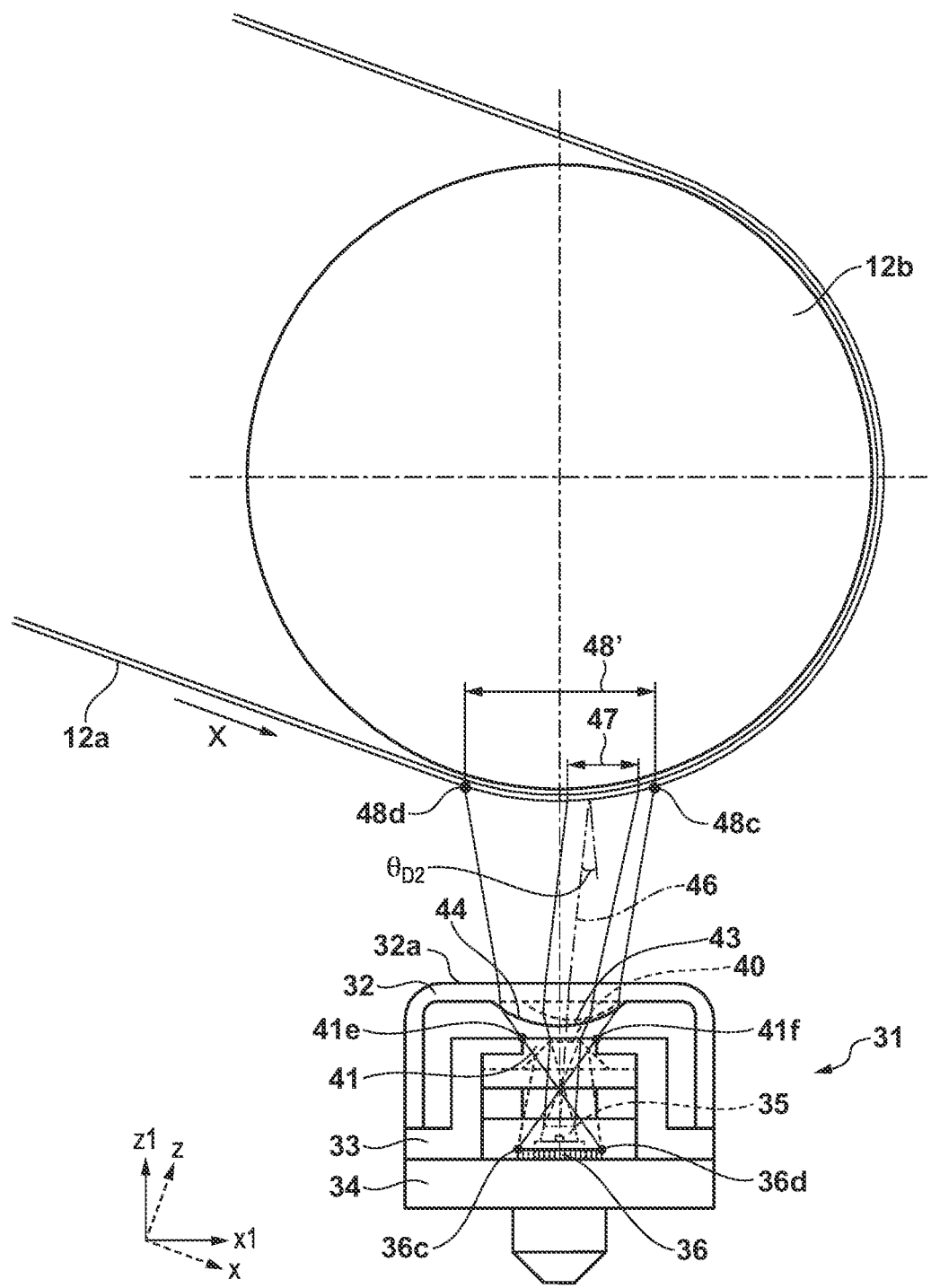
FIG. 21 is a diagram illustrating an optical path for a divergent optical system.

Although the first embodiment describes the first irradiation light 46 as parallel light for convenience, the first irradiation light 46 need not be parallel light. FIGS. 18 and 19 illustrate cases where the first irradiation light 46 is convergent light. FIGS. 20 and 21 illustrate cases where the first irradiation light 46 is divergent light. In both cases, using the toner sensor (the optical sensor 31) according to the first embodiment makes it possible to improve the toner detection accuracy. Although the first embodiment describes the second irradiation light 49 as parallel light too, the second irradiation light 49 may also be convergent light or divergent light.

In the first embodiment, the first lens unit 43, the second lens unit 44, and the third lens unit 45 are provided between the LED 35 and the target surface to be irradiated. However, because it is sufficient for the first irradiation light 46 to be slanted in both the transport direction and the width direction of the intermediate transfer belt 12*a*, the lens units are not absolutely necessary. For example, the same effects can be achieved if the first opening 40 provided in the housing 33 is disposed in a position shifted from a position directly above the LED 35, in both the transport direction and the width direction. In other words, the first irradiation light 46 can be slanted in both the transport direction and the width direction even without the lens units.

In the first embodiment, the second opening 41 used by the first light receiving unit 36 to detect the diffused reflection light from the intermediate transfer belt 12*a* also serves as an opening for the second light receiving unit 37 to detect the regularly-reflected light from the intermediate transfer belt 12*a*. However, to be more specific, the through-hole including the second opening 41 may have a step. In other words, the opening for the first light receiving unit 36 to detect the diffused reflection light may be constituted by points 41*b*, 41*c*, 41*e*, and 41*f*. The opening for the second light receiving unit 37 to detect the regularly-reflected light may be constituted by points 41*a*, 41*d*, 41*e*, and 41*f*. The same opening may be used as the opening for detecting the diffused reflection light and the opening for detecting the regularly-reflected light, or the opening for detecting the diffused reflection light and the opening for detecting the regularly-reflected light may be provided in the housing 33 separately.

In the first embodiment, the third lens unit 45 includes a lens for detecting diffused reflection light from the intermediate transfer belt 12*a* and a lens for detecting regularly-reflected light from the intermediate transfer belt 12*a*. However, these lenses may be implemented as a single dual-use lens.

The first embodiment describes the first light receiving unit 36 and the second light receiving unit 37 as each including a plurality of light-receiving elements. However, as long as the first light receiving unit 36 and the second light receiving unit 37 can each detect a sufficient amount of light, those units may each be constituted by a single light-receiving element.

Second Embodiment

Figure 22:
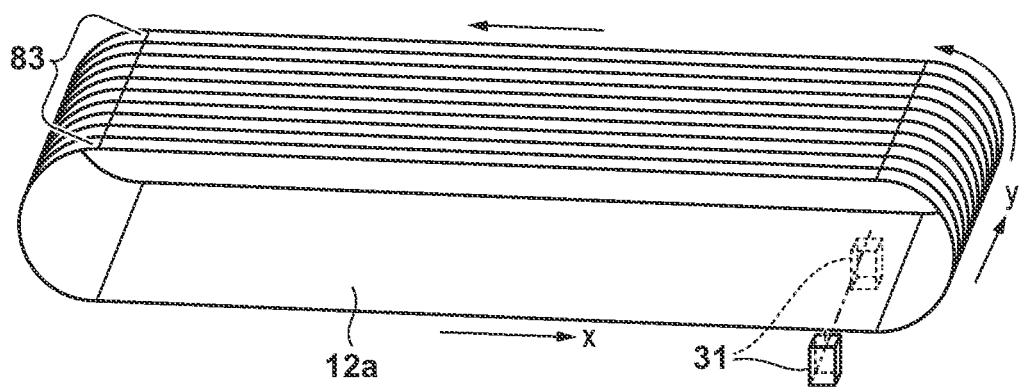
FIG. 22 is a diagram illustrating another example of a location where an optical sensor is installed.

The first embodiment described a case where the outer circumferential surface (side surface) of a cylindrical shape formed by the intermediate transfer belt 12*a* wrapping around the drive roller 12*b* is the target surface to be irradiated. This makes it less likely that the target surface to be irradiated will vibrate, leading to an improvement in the toner detection accuracy. On the other hand, as illustrated in FIG. 22, a flat part is formed in the intermediate transfer belt 12*a* in the area between the drive roller 12*b* and the driven roller 12*d*. The toner sensor (the optical sensor 31) may be disposed so as to use this flat part as the target surface to be irradiated.

Figure 23:
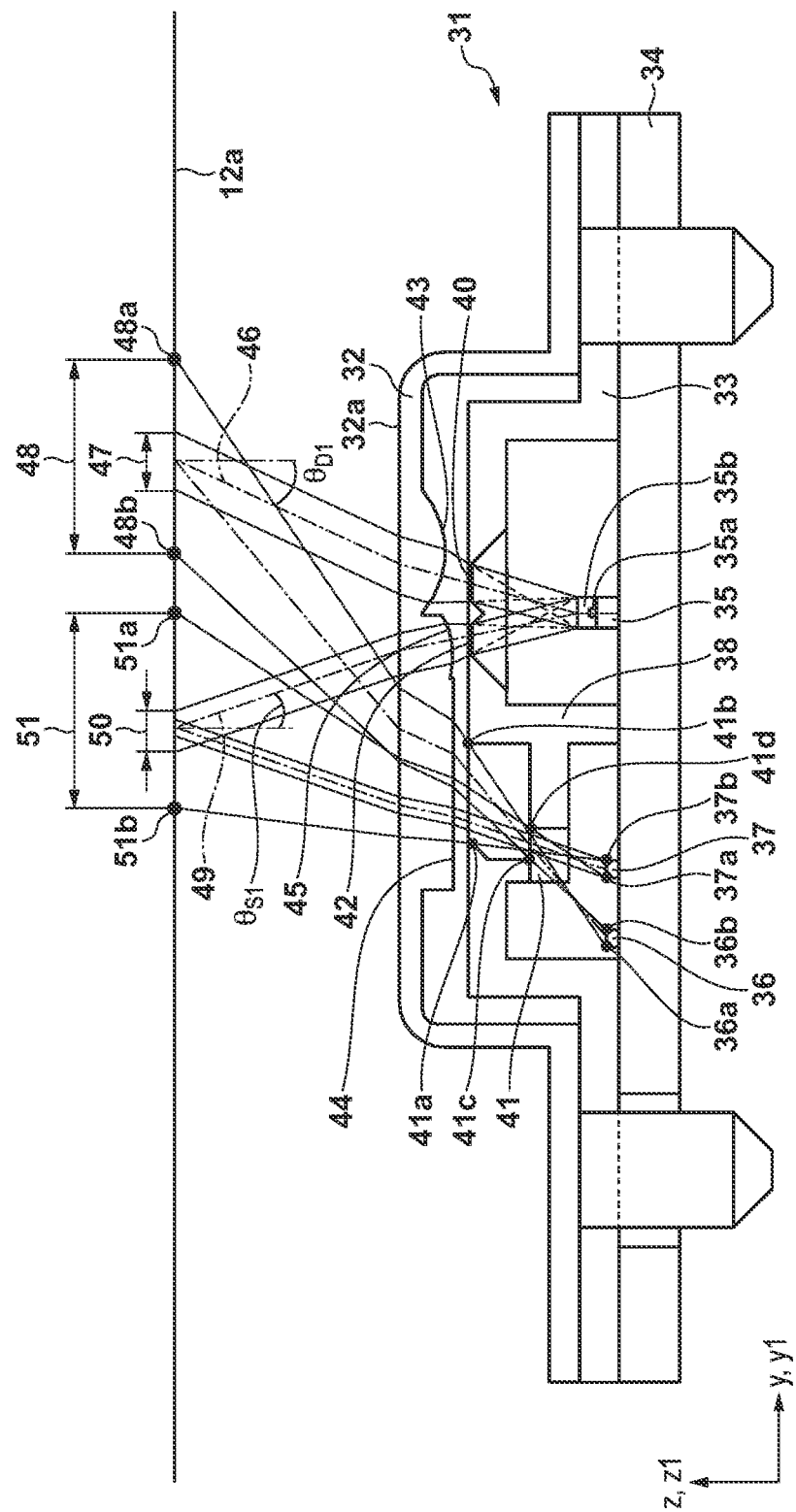
FIG. 23 is a diagram illustrating an optical path of an optical sensor.
Figure 24A:
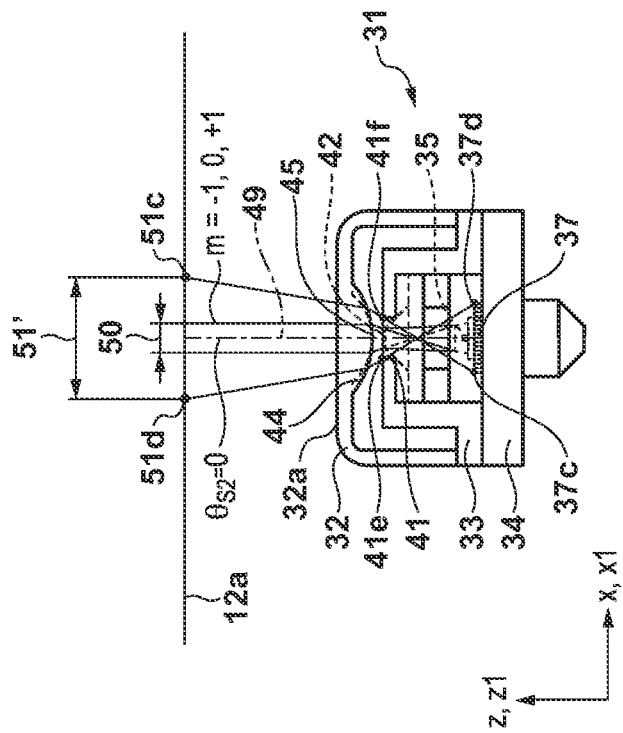
FIGS. 24A and 24B are diagrams illustrating optical paths of an optical sensor.
Figure 24B:
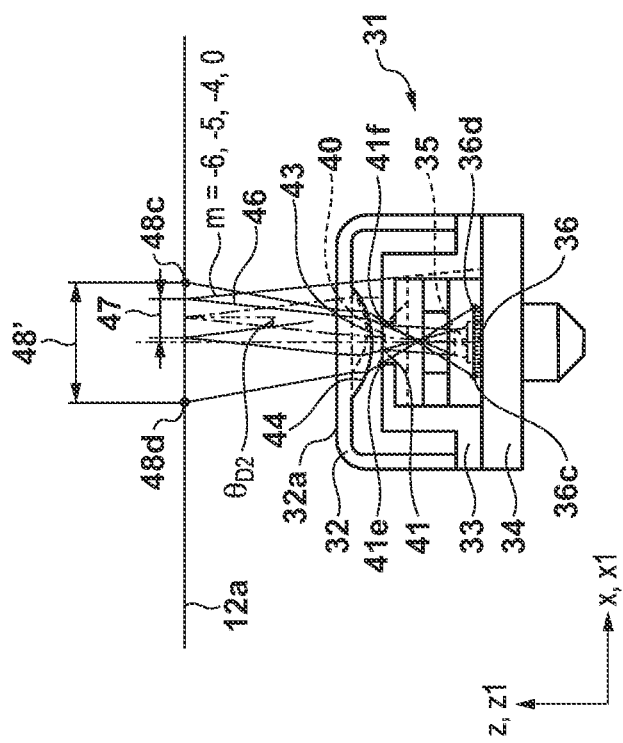

FIG. 23 is a schematic cross-sectional view of the optical sensor 31 seen from the downstream side of the transport direction of the intermediate transfer belt 12*a*. FIG. 24A illustrates the optical path of diffused reflection light of the optical sensor 31, seen from the width direction of the intermediate transfer belt 12*a*. FIG. 24B illustrates the optical path of regularly-reflected light of the optical sensor 31, seen from the width direction of the intermediate transfer belt 12*a*. The only difference is that the target surface to be irradiated has been changed from a cylindrical measurement surface to a flat surface, and the rest of the configuration is as has already been described. It is assumed here that the interval d of the grooves 83 in the intermediate transfer belt 12*a* is 3.7 µm. The light ray wavelength λ of the LED 35 is also assumed to be 850 nm. The first irradiation light 46, the second irradiation light 49, the first light-receiving region 48, and the second light-receiving region 51 are all the same as in the first embodiment. The x direction is parallel to the transport direction of the flat part of the intermediate transfer belt 12*a*, and is parallel to the shorter direction of the optical sensor 31 (the x1 direction). The y direction is parallel to the width direction of the intermediate transfer belt 12*a*, and is parallel to the longer direction of the optical sensor 31 (the y1 direction). The z direction is parallel to the height direction of the optical sensor 31 (the z1 direction). In other words, the circuit board 34 is disposed in a substantially horizontal orientation.

As illustrated in FIG. 24A, the flat part of the intermediate transfer belt 12*a* is irradiated by the first irradiation light 46 with the first irradiation light 46 tilted relative to the normal line of the flat part. Specifically, in the second embodiment, the emission angle of the first irradiation light 46 relative to the vertical line of the LED 35 is the same as the emission angle in the first embodiment. However, because the installation angle of the optical sensor 31 has been changed, the irradiation angle θD2 is 6.2°. Although the irradiation angle θD2 is small, the regularly-reflected light and diffracted light produced in the irradiated region 47 is unlikely to enter into the second opening 41. This is because the emission angle of the first irradiation light 46 from the optical sensor 31, and the size and arrangement of the second opening 41, are designed as described in the first embodiment. Accordingly, in the second embodiment, the detection performance of the first light receiving unit 36 is improved.

There is a condition that the regularly-reflected light and the diffracted light originating from the first irradiation light 46 travel in a direction away from the first light receiving unit 36 in both the transport direction and the width direction. The light guide path from the LED 35 and the light guide path to the first light receiving unit 36 are designed in this manner. In other words, the arrangements of the first opening 40 and the second opening 41 relative to the LED 35 satisfy this condition. When the first lens unit 43 and the second lens unit 44 are used, the first lens unit 43 and the second lens unit 44 are arranged so that this condition is satisfied. Accordingly, the detection performance of the first light receiving unit 36 is improved.

Third Embodiment

A third embodiment pertains to an example in which a diffuse reflection component of the reflective properties of the intermediate transfer belt 12a is large. To be more specific, the third embodiment uses an intermediate transfer belt 12a in which the grooves 83 are not provided in the surface layer of the intermediate transfer belt 12a, but which has a large diffuse reflection component.

1. Scattering Characteristics of Intermediate Transfer Belt

Figure 6B:
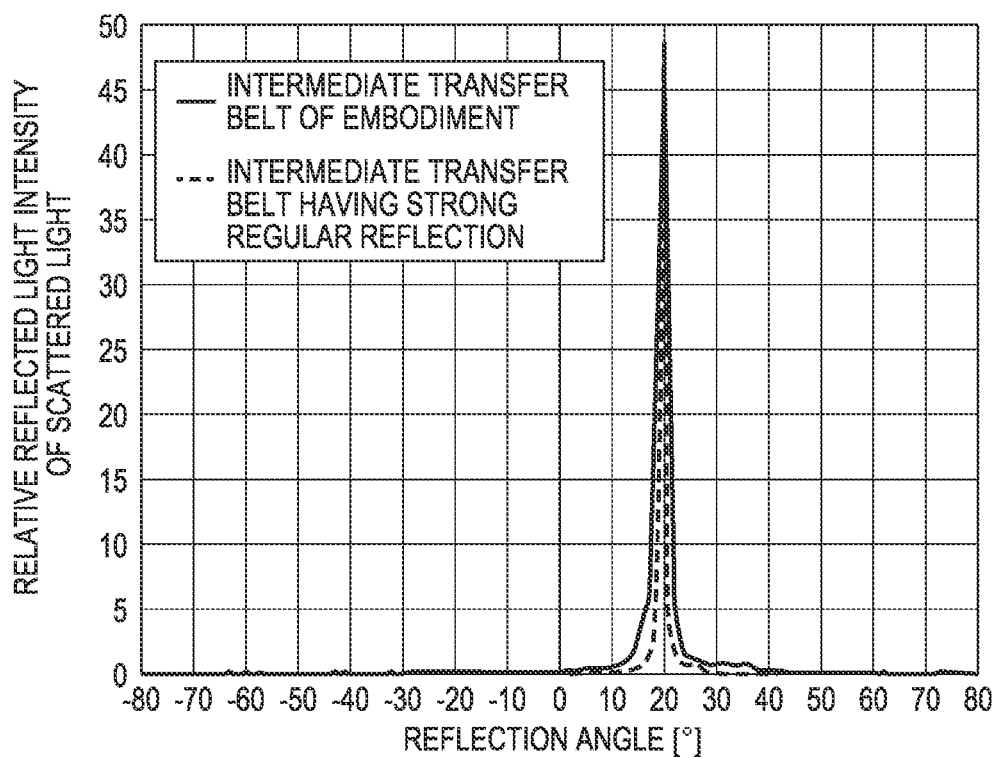

FIG. 6B illustrates an example of the angular distribution characteristics of scattered light (BRDF) of the intermediate transfer belt 12a according to the third embodiment. This measurement is taken using Mini-Diff V1, a compact and simple scattering measurement device manufactured by Cybernet Systems Co., Ltd. The light wavelength λ is 622 nm. The incident angle with respect to the surface of the intermediate transfer belt 12a is −20°. The solid line represents the BRDF according to the third embodiment. The broken line represents the BRDF according to a comparative example (an intermediate transfer belt for which the diffuse reflection component is small and the regular reflection is strong).

As can be seen from FIG. 6B, with the BRDF of the intermediate transfer belt 12a according to the third embodiment, the diffuse reflection component spreads around the peak of the regularly-reflected light. With the BRDF according to the comparative example, however, the regularly-reflected light has a high peak, and the diffuse reflection component arising around the peak is extremely small.

2. Configuration of Toner Sensor

Figure 25:
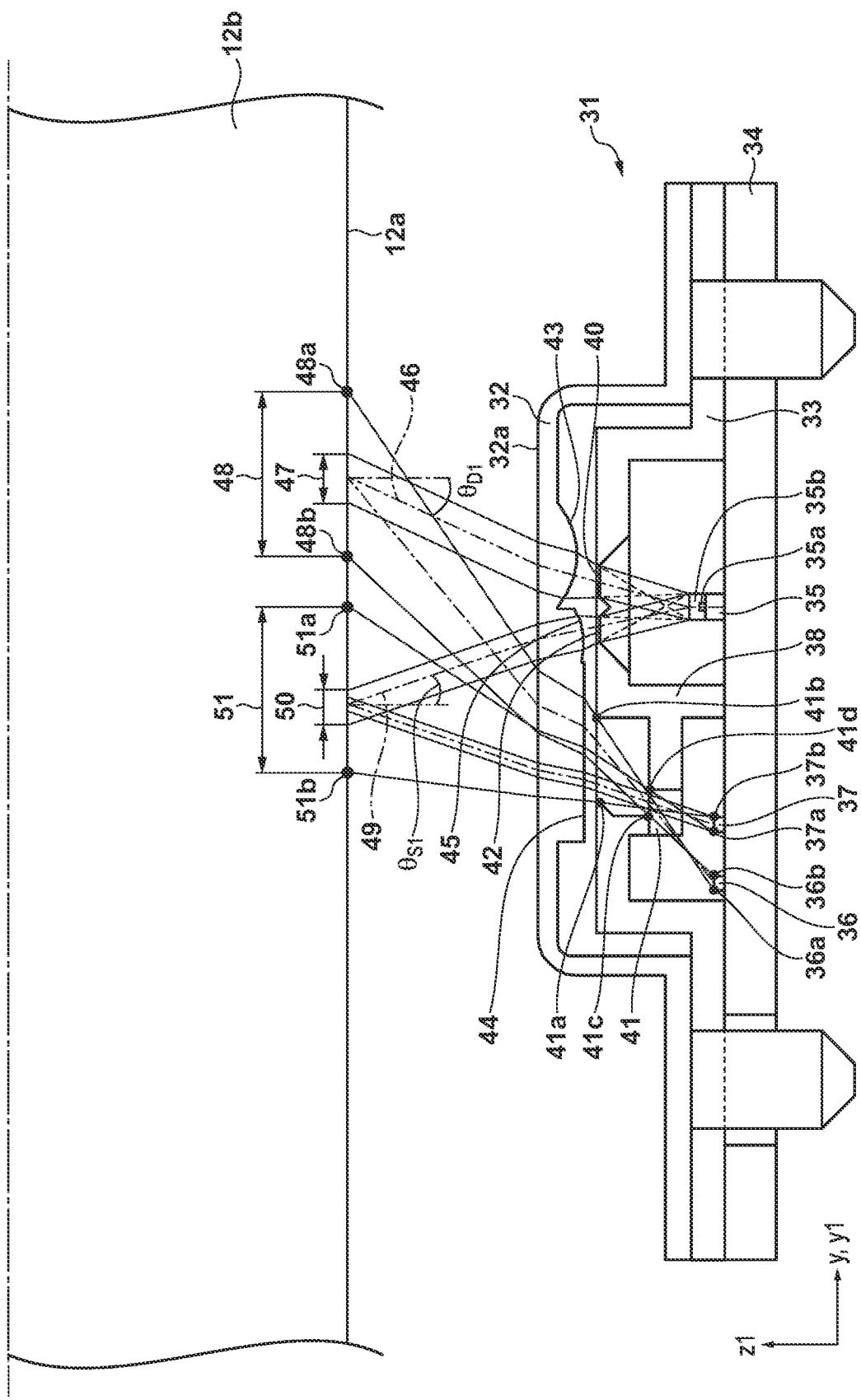
FIG. 25 is a diagram illustrating an optical path of an optical sensor.
Figure 26A:
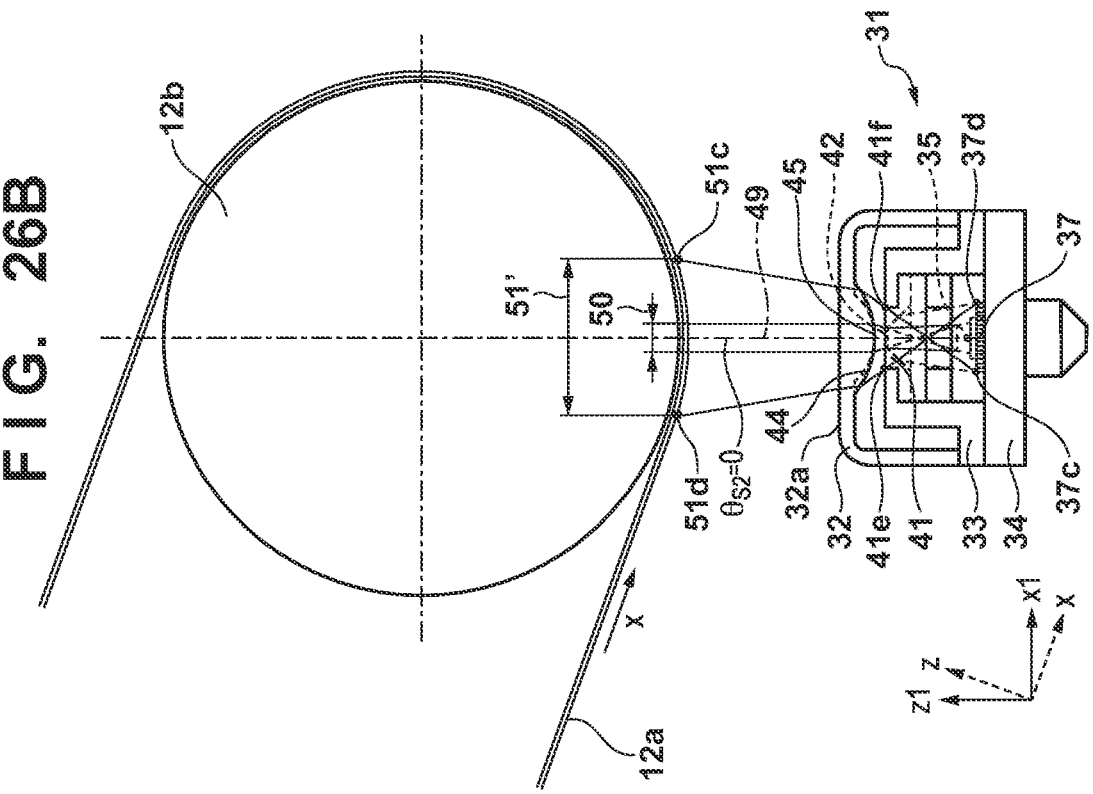
FIGS. 26A and 26B are diagrams illustrating optical paths of an optical sensor.
Figure 26B:
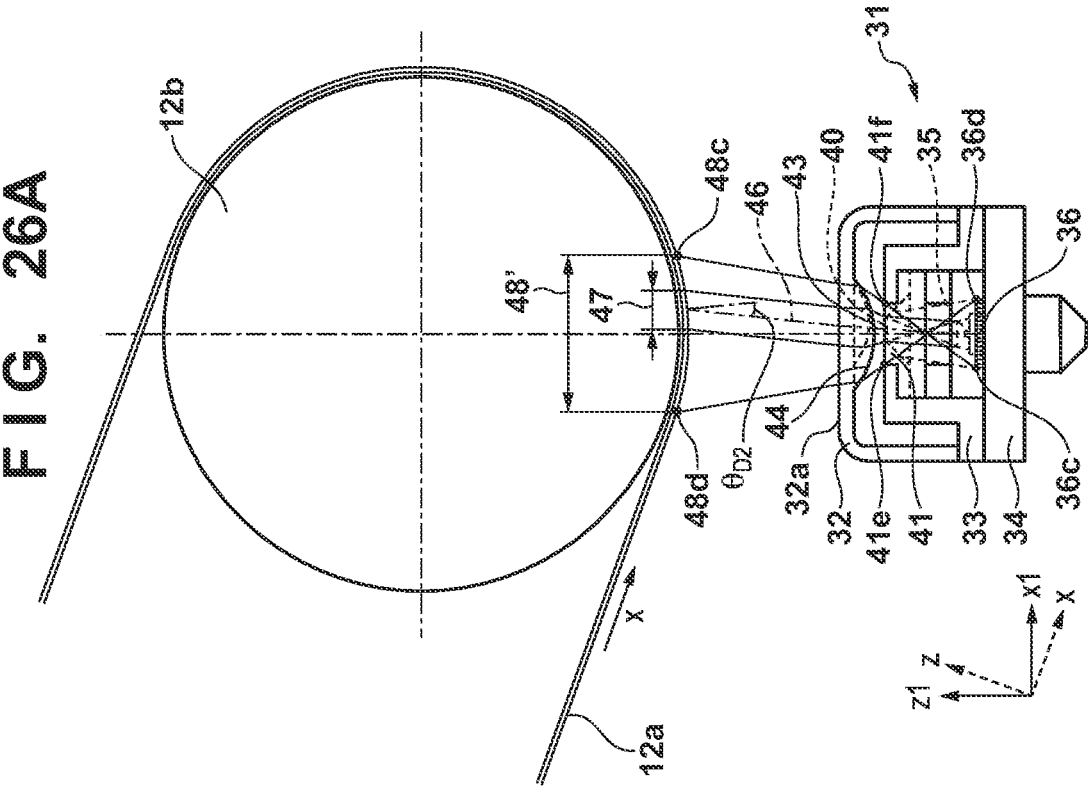

FIG. 25 is a schematic cross-sectional view of the optical path of the optical sensor 31 according to the third embodiment, seen from the downstream side of the transport direction. FIG. 26A is a schematic cross-sectional view of a path of diffused reflection light of the optical sensor 31, seen from the width direction. FIG. 26B is a schematic cross-sectional view of a path of regularly-reflected light of the optical sensor 31, seen from the width direction.

The only difference between the third embodiment and the first embodiment is the BRDF of the intermediate transfer belt 12a, and the structure, arrangement, and the like of the optical sensor 31 are the same. By using the optical sensor 31 in this manner, the first light receiving unit 36 can detect toner with a high level of accuracy even in cases where the diffuse reflection component of the target to be irradiated is strong.

3. Comparative Example

The third embodiment also uses the optical sensor 31' according to the comparative example described in the first embodiment, and the performance of the third embodiment will be contrasted with the performance of the comparative example. The structure of the optical sensor 31' and the installation angle thereof relative to the intermediate transfer belt 12a are as described above.

As illustrated in FIG. 6B, with the intermediate transfer belt 12a according to the third embodiment, a strong diffuse reflection component is present in the vicinity of the regularly-reflected light. It is necessary to prevent this diffuse reflection component from being incident on the first light receiving unit 36. In the third embodiment, the first irradiation light 46 is slanted in both the width direction and the transport direction. This makes it less likely that the regularly-reflected light produced in the irradiated region 47, and the strong diffuse reflection component arising in the vicinity of that regularly-reflected light, will be incident on the first light receiving unit 36.

Figure 27A:
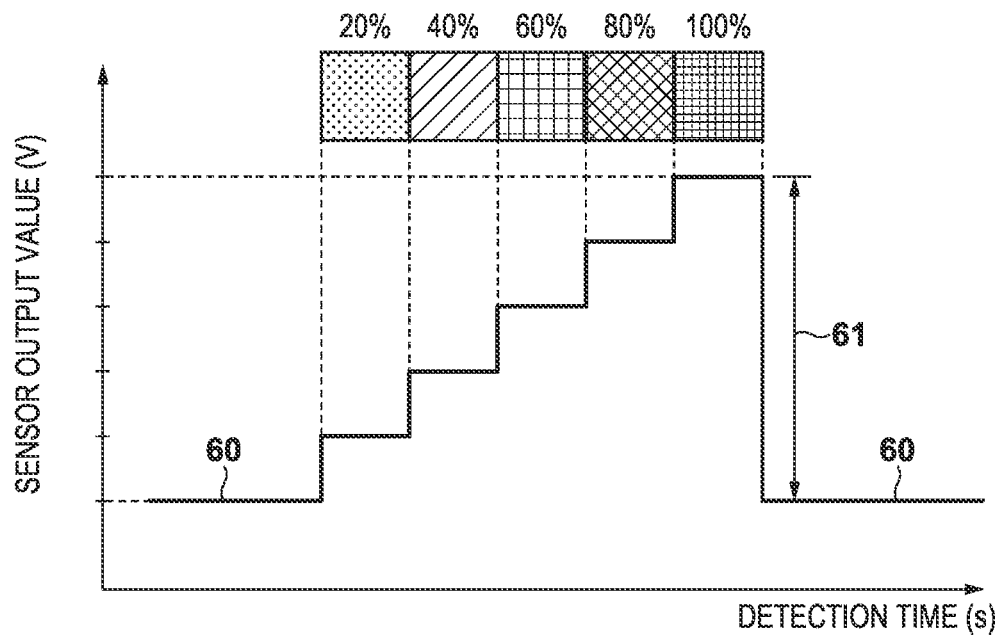
FIGS. 27A and 27B are diagrams illustrating test pattern detection results.
Figure 27B:
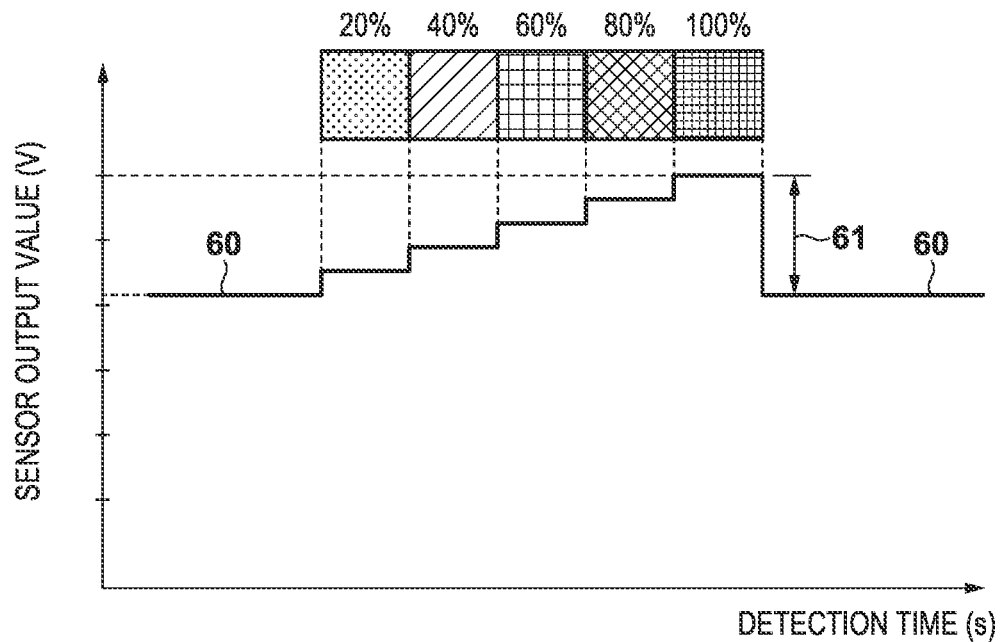

FIG. 27A illustrates a result of detecting the test pattern 30 according to the third embodiment. FIG. 27B illustrates a result of detecting the test pattern 30 according to the comparative example. Here, too, five test patterns 30 having densities which differ in 20% increments, as well as the substrate (surface) of the intermediate transfer belt 12a, are detected.

The first light receiving unit 36 is a light-receiving element for detecting diffuse reflection from the toner. With the optical sensor 31, the irradiation direction of the first irradiation light 46 is tilted relative to the normal line of the irradiated region 47 in order to avoid the diffused reflection light produced at the surface of the intermediate transfer belt 12a. The output value 60 obtained when detecting the surface of the intermediate transfer belt 12a drops as a result. The aforementioned difference 61 increases as well, and the diffused reflection light from the toner can therefore be detected to a sufficient extent.

As illustrated in FIG. 27B, with the optical sensor 31' according to the comparative example, the diffuse reflection component produced at the intermediate transfer belt 12a is large, and the output value 60 rises as a result. The difference 61 therefore drops, which makes it difficult to detect the diffused reflection light from the toner to a sufficient extent.

4. Effects of Third Embodiment

The effects of the third embodiment are basically the same as the effects of the first embodiment. Having the first irradiation light 46 slant from the normal line of the target surface to be irradiated in both the transport direction and the width direction improves the detection performance of the first light receiving unit 36. Furthermore, the regularly-reflected light produced by the first irradiation light 46 travels in a direction away from the first light receiving unit 36 in both the transport direction and the width direction. Accordingly, the detection performance of the first light receiving unit 36 is improved.

The third embodiment uses the intermediate transfer belt 12a having a large diffuse reflection component. However, depending on the manufacturing method, material, and so on of the intermediate transfer belt 12a, the BRDF may differ between the transport direction and the width direction (anisotropy). The optical sensor 31 functions effectively in such cases as well. FIG. 28 illustrates an example of the angular distribution characteristics of scattered light (BRDF) of the intermediate transfer belt 12a having anisotropy. In FIG. 28, the solid line represents the BRDF in the width direction, and the broken line represents the BRDF in the transport direction. As can be seen from FIG. 28, the diffuse reflection component spreads relative to the peak of the regularly-reflected light in the width direction, but the diffuse reflection component is small in the transport direction. In this manner, the optical sensor 31 can accurately detect diffused reflection light from the toner even in cases where the intermediate transfer belt 12a having anisotropy is used.

The third embodiment describes the optical sensor 31 as detecting a side surface of a cylindrical shape. However, the arrangement of the optical sensor 31 according to the second embodiment may be used for the intermediate transfer belt 12a according to the third embodiment as well. In other words, the optical sensor 31 may be disposed relative to the intermediate transfer belt 12a so as to detect the flat part.

Fourth Embodiment

1. Configuration of Toner Sensor

Figure 29B:
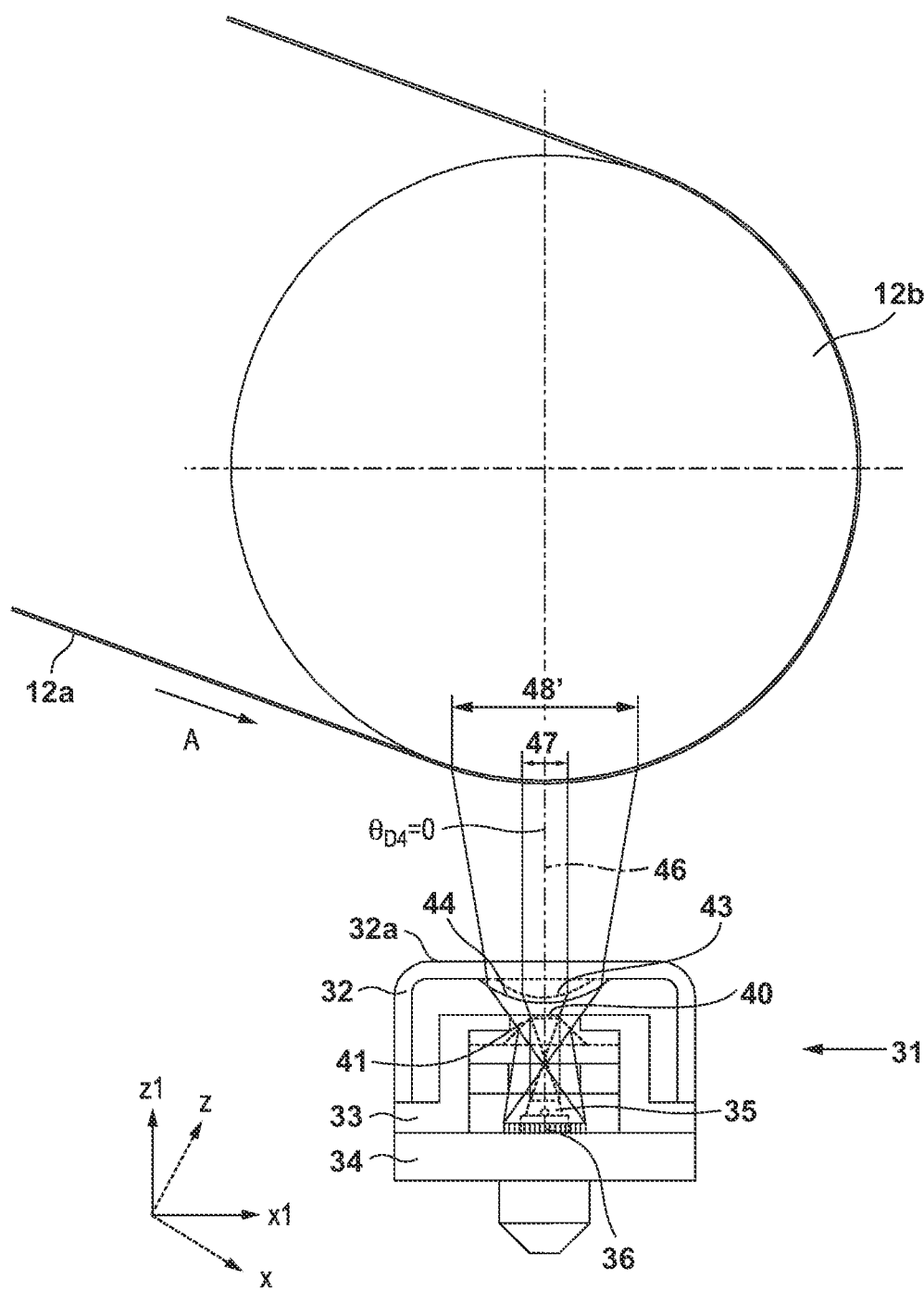

An optical sensor 31 according to a fourth embodiment will be described in detail with reference to FIGS. 29A to 31. FIG. 29A is a cross-sectional view of an optical path taking the x1 direction as a sight direction. FIG. 29B is a cross-sectional view illustrating the first irradiated region 47 when the y direction is viewed as the sight direction.

Figure 30A:
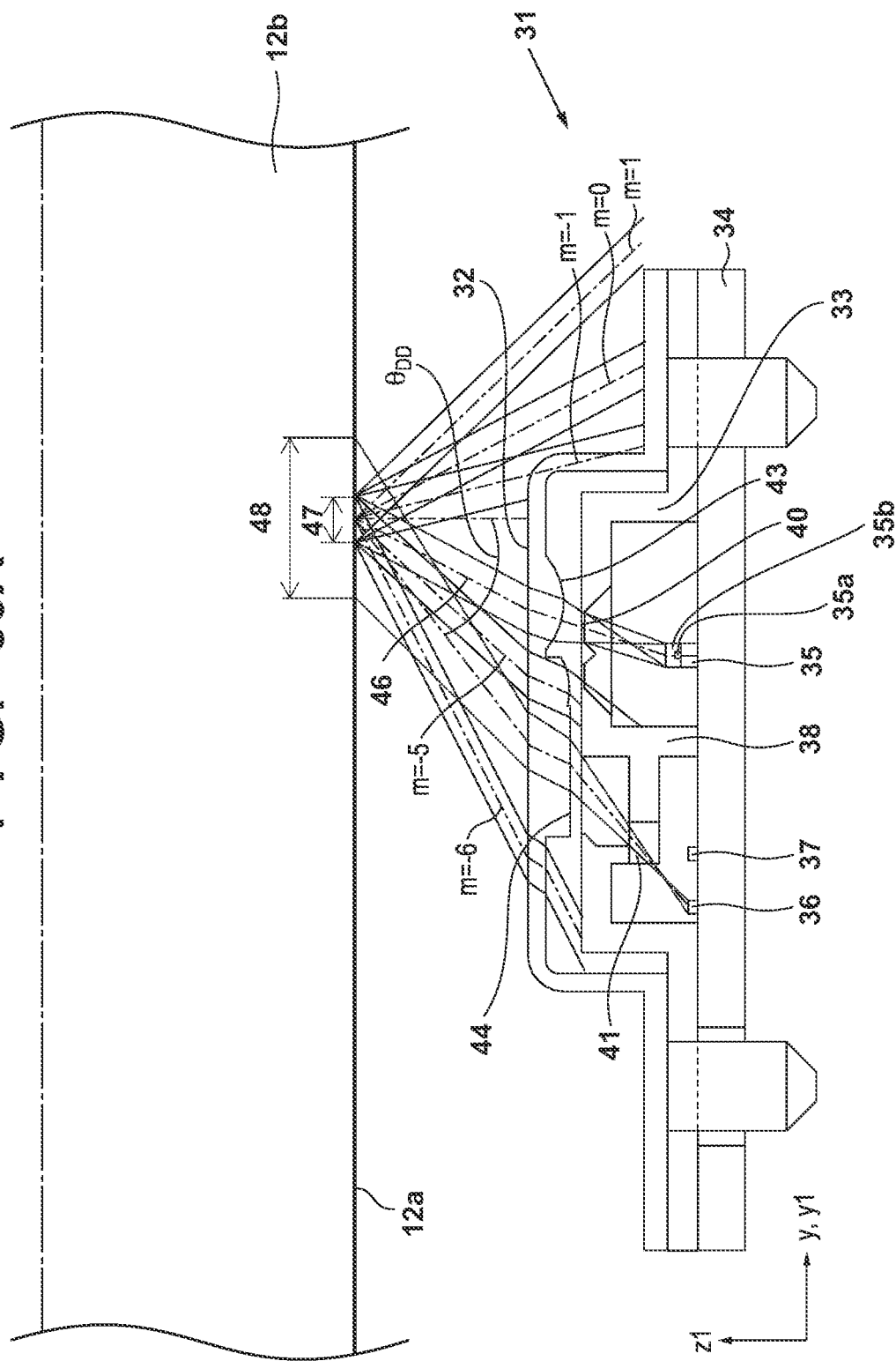
FIGS. 30A and 30B are diagrams illustrating an optical path of diffracted light according to a fourth embodiment.

In the fourth embodiment as well, the optical sensor 31 is disposed so as to face a side surface of a substantially cylindrical shape formed by the intermediate transfer belt 12a wrapping around the drive roller. In FIGS. 29A to 30B as well, they direction and the y1 direction are parallel to the width direction of the intermediate transfer belt 12a. Accordingly, the direction in which the plurality of grooves 83 are arranged is the y1 direction. In FIGS. 29A and 30A, the direction in which the plurality of grooves 83 extend is the direction from the far side to the near side of the drawings.

In the fourth embodiment as well, the LED 35, the first light receiving unit 36, and the second light receiving unit 37 are arranged in the y1 direction. A distance between the first light receiving unit 36 and the LED 35 is greater than a distance between the second light receiving unit 37 and the LED 35.

Accordingly, in FIG. 29A, the first irradiated region 47 is arranged on the right side of the second irradiated region 50. Note that the second irradiated region 50 for detecting regularly-reflected light is as described above in the first to third embodiments. As such, the fourth embodiment will not describe the second irradiated region 50 in detail.

2. Optical Path for Detecting Diffused Reflection Light

As illustrated in FIGS. 29A and 29B, the first irradiation light 46 detected by the first light receiving unit 36 is output from the LED 35 and passes through the first opening 40 and the first lens unit 43. The first opening 40 and the first lens unit 43 are disposed in positions shifted to the right (the +y1 direction) from a normal line extending from the LED 35 toward the intermediate transfer belt 12a. The first irradiation light 46 is also a light ray which advances in a direction slanted to the right relative to the normal line. Here, the "normal line" is the normal line of a mounting surface of the circuit board 34, and is parallel to the z1 direction. In this manner, the first irradiation light 46 is slanted to the right relative to the normal line, and thus regularly-reflected light from the first irradiation light 46 (m=0th-order light) also travels in a direction away from the second opening 41 and the first light receiving unit 36. Here, an irradiation angle θD3 is defined. The irradiation angle θD3 is −28°, for example.

As illustrated in FIG. 29B, the first opening 40 and the first lens unit 43 are disposed in the normal direction of the LED 35 when the y1 direction is taken as the sight direction. An irradiation angle θD4 is 0°.

In the fourth embodiment as well, the first irradiated region 47 is smaller than the first light-receiving regions 48 and 48'. As such, the first light receiving unit 36 actually detects diffused reflection light from the first irradiated region 47. In the fourth embodiment as well, the refractive index and radius of the first lens unit 43 are set so that the focal length of the first lens unit 43 and the distance from the first lens unit 43 to the emission point of the LED 35 are equal. Accordingly, the first irradiation light 46 emitted from the first lens unit 43 is parallel light, with which the first irradiated region 47 is irradiated.

3. Diffracted Light of First Irradiation Light

Figure 30B:
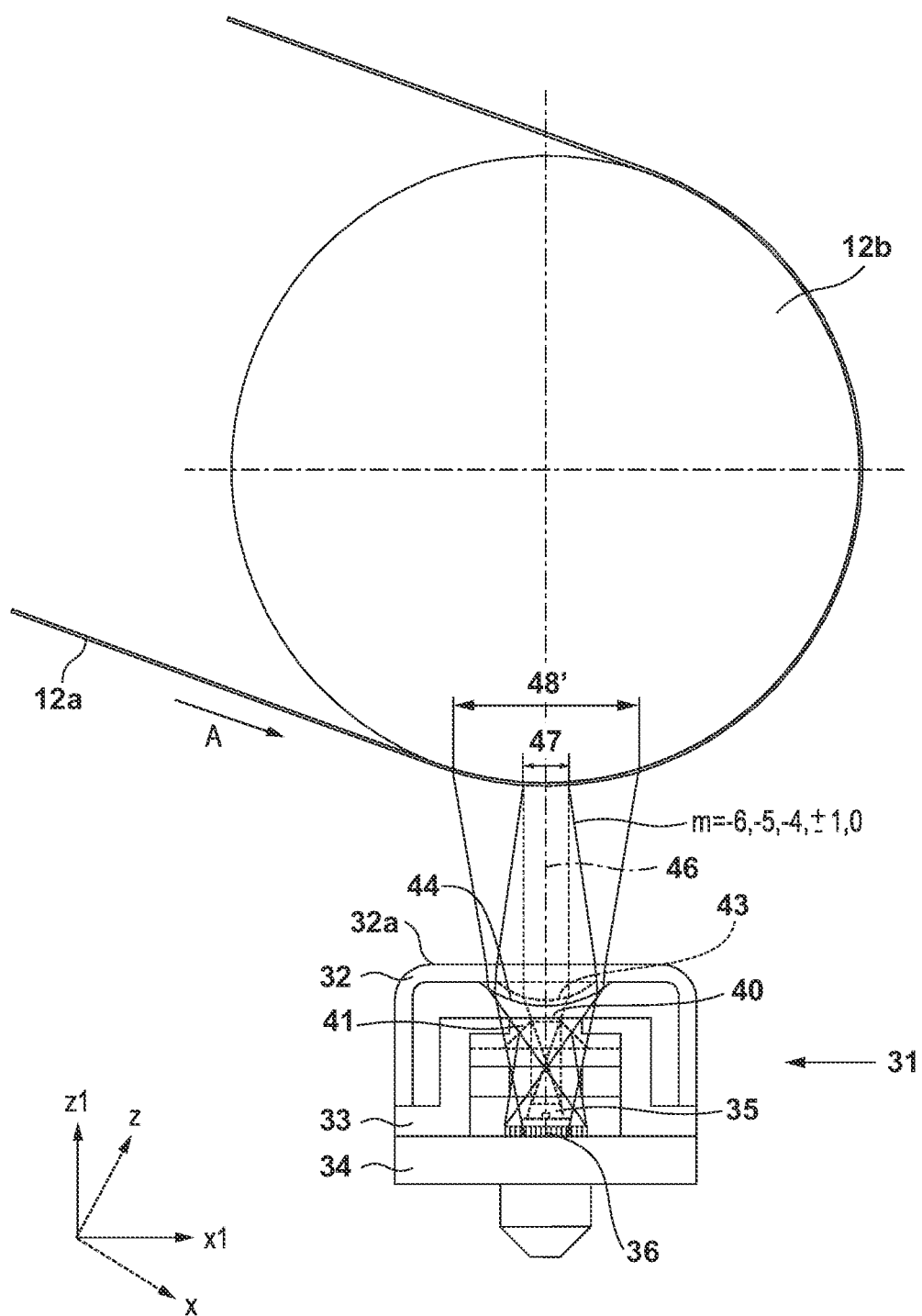

FIGS. 30A and 30B are cross-sectional views illustrating the optical path of the diffracted light of the first irradiation light 46. In particular, FIG. 30A is a cross-sectional view of the optical path taking the x1 direction as a sight direction. FIG. 30B is a cross-sectional view of an optical path taking the y direction as a sight direction. FIG. 31 illustrates the reflection angle of the diffracted light of the first irradiation light 46 (this may also be called the "diffraction angle" or "emission angle").

As illustrated in FIGS. 30A and 30B, the diffracted light does not enter the second opening 41 and is not incident on the first light receiving unit 36. To be more specific, the second opening 41 and the first light receiving unit 36 are disposed between an incident position of −5th-order diffracted light and an incident position of −6th order diffracted light so that the −5th- to −6th-order diffracted light does not enter the second opening 41 and is not incident on the first light receiving unit 36. Furthermore, the irradiation angle θD3 of the first irradiation light 46 is set to a comparatively large angle)(−28°. As such, the second opening 41 and the first light receiving unit 36 are disposed away from −1st-order diffracted light and +1st-order diffracted light, which have a high light intensity. In this manner, low-order diffracted light also does not enter the second opening 41 and is not incident on the first light receiving unit 36. As described in the first embodiment with reference to FIG. 6, the intensity of lower-order diffracted light, such as the −1st and 1st orders, is relatively high. Furthermore, comparing the light intensity of mth-order diffracted light with the light intensity of (m+1)th-order diffracted light, the light intensity of the lower-order (mth-order) diffracted light is higher (when m is a positive integer). As such, the second opening 41 and the first light receiving unit 36 are disposed at positions which avoid the ±1st-order diffracted light and at which the diffracted light from the mth to the (m+1)th order is not incident. As a result, no significant diffracted light is incident on the first light receiving unit 36.

4. Technical Spirit Derived from Fourth Embodiment

In the fourth embodiment, the LED 35, the first light receiving unit 36, and the second light receiving unit 37 are arranged along the y1 direction in which the plurality of grooves 83 are arranged (i.e., the width direction of the grooves 83). The first irradiation light 46 is emitted with a slant in the y1 direction from the normal direction of the target surface to be irradiated. The slant (irradiation angle) of the first irradiation light 46 is set so that the travel direction of the first irradiation light 46 is away from the second opening 41 and the first light receiving unit 36. Furthermore, the first light receiving unit 36 is disposed further from the LED 35 than the second light receiving unit 37. This makes it possible for the first light receiving unit 36 to avoid strong low-order reflected light (diffracted light), such as the −1st, 0th, and +1st orders, of the reflected light from the target surface to be irradiated.

Furthermore, the irradiation angle of the first irradiation light 46 is set to an angle that is within a range at which the mth-order diffracted light and the (m+1)th-order diffracted light do not enter the second opening 41 and are not incident on the first light receiving unit 36. This makes it possible for the first light receiving unit 36 to reliably avoid diffracted light from the target surface to be irradiated.

In the fourth embodiment, the first light receiving unit 36 is disposed between the −5th-order diffracted light and the −6th-order diffracted light. In particular, the first light receiving unit 36 may be disposed in what is substantially the center between the −5th-order diffracted light and the −6th-order diffracted light. To be more specific, as illustrated in FIG. 30A, a light receiving angle θDD of the first light receiving unit 36 may be set to 52°. In the fourth embodiment, as long as θDD is between 46° and 58°, the first light receiving unit 36 can reliably avoid the −5th-order diffracted light and the −6th-order diffracted light. As such, "what is substantially the center" is defined as a range where the light receiving angle θDD is 52°±6° (46° to 58°).

In the fourth embodiment, the first irradiation light 46 is parallel light. Parallel light is achieved by arranging the first lens unit 43 and the LED 35 so that the focal length of the first lens unit 43 and the distance from the first lens unit 43 to the LED 35 are equal. Furthermore, the first irradiated region 47 is set so as to be smaller than the first light-receiving region 48. As a result, the reflected light is substantially parallel light, and the irradiation range (beam diameter) of the reflected light becomes smaller. This makes it possible to ensure a broad region that is not irradiated by the diffracted light.

Although the fourth embodiment assumes that the first irradiation light 46 is parallel light, this is merely one example. The first irradiation light 46 does not absolutely have to be parallel light. Variations (tolerances) occur in the installation position of the first light receiving unit 36 in the mass-production of the optical sensor 31. Assuming that the installation position of the first light receiving unit 36 will vary within the tolerance, the position of the first light receiving unit 36 is designed so that no diffracted light will be incident on the first light receiving unit 36. When the radius of the first lens unit 43 is set to be larger, the first irradiation light 46 is divergent light. Conversely, when the radius of the first lens unit 43 is set to be smaller, the first irradiation light 46 is convergent light. For example, the arrangement according to the fourth embodiment can ensure a sufficient range which is not irradiated with diffracted light even if geometrically, the first irradiation light 46 is convergent light at 5° or divergent light at 5° relative to parallel light.

In the fourth embodiment, a cylindrical surface is formed on part of the surface of the intermediate transfer belt 12a as a result of the intermediate transfer belt 12a wrapping on the rollers. In the fourth embodiment, the target surface to be irradiated is a cylindrical surface. However, the above-described effects are also achieved even if the target surface to be irradiated is a flat surface as in the second embodiment.

As described above, according to the configuration of the fourth embodiment, it is less likely that diffracted light will be incident on the first light receiving unit 36. As a result, a drop in detection accuracy of the optical sensor 31, which is a toner sensor or the like, that can be caused by reflected light from the target surface to be irradiated, can be suppressed.

Technical Spirit Derived from Embodiments

<Perspective 1>

The LED 35 is an example of a light-emitting element that irradiates, with light, a target surface to be irradiated set in one part of a surface of a rotating body that rotates. The first light receiving unit 36 is an example of a first light receiving unit that receives diffused reflection light from a toner image formed on the surface of the rotating body. The second light receiving unit 37 is an example of a second light receiving unit that receives regularly-reflected light from the surface of the rotating body. The circuit board 34 is an example of a circuit board on which the light-emitting element, the first light receiving unit, and the second light receiving unit are mounted. The housing 33 is an example of a housing including a first opening and a second opening, and provided so as to enclose the light-emitting element, the first light receiving unit, and the second light receiving unit. As illustrated in FIG. 8 and the like, the first opening 40 is provided in a first light guide path arranged between the light-emitting element and a first irradiated region of the target surface to be irradiated. Furthermore, the first opening 40 is arranged so that light output from the light-emitting element (the first irradiation light 46) travels toward the first irradiated region 47. As illustrated in FIG. 8 and the like, the second opening 41 is provided in a second light guide path arranged between the first irradiated region 47 and the first light receiving unit 36. The second opening 41 is furthermore arranged in a position that satisfies conditions such as the following. That is, diffused reflection light from the toner image passes through the second opening 41 when the toner image passes the first irradiated region 47. Furthermore, regularly-reflected light, as well as diffused reflection light or diffracted light, from the surface of the rotating body do not pass through the second opening 41 when the surface of the rotating body passes the first irradiated region 47. Through this, a drop in detection accuracy of an optical sensor such as a toner sensor, which can be caused by reflected light from the target surface to be irradiated, can be suppressed.

<Perspective 2>

As illustrated in FIG. 1 and the like, the rotating body may be an endless belt stretched between the drive roller 12b and/or the driven roller 12d, which have a cylindrical shape. In this case, the surface of the rotating body may be a side surface of a cylindrical shape formed by the endless belt wrapping around the drive roller 12b. As illustrated in FIGS. 8 and 9A, the first irradiation light 46 is light emitted from the first opening 40 and traveling toward the first irradiated region 47. The light-emitting element and the first opening are arranged so that the first irradiation light 46 is slanted relative to a normal line of the side surface of the cylindrical shape in both a rotation direction of the rotating body and the width direction of the drive roller 12b (the axial direction of the rotating body). Through this, a drop in detection accuracy of an optical sensor such as a toner sensor, which can be caused by reflected light from the target surface to be irradiated, can be suppressed.

<Perspective 3>

As illustrated in FIG. 22, the surface of the rotating body may be a flat surface, of an outer circumferential surface of the endless belt, located between the drive roller 12b and the driven roller 12d. As illustrated in FIGS. 23, 24A, and the like, the first irradiation light 46 is slanted relative to a normal line of the flat surface in both the rotation direction of the rotating body and the width direction of the drive roller (the axial direction of the rotating body). The light-emitting element and the first opening are arranged so that this condition is satisfied. Through this, a drop in detection accuracy of an optical sensor such as a toner sensor, which can be caused by reflected light from the target surface to be irradiated, can be suppressed.

<Perspective 4>

As illustrated in FIGS. 10 and 12A, the first opening 40 and the light-emitting element are arranged so that regularly-reflected light formed by the first irradiation light 46 reflecting at the first irradiated region 47 travels in a direction away from the second opening 41 and the first light receiving unit 36. This makes it possible for the first light receiving unit 36 to accurately detect diffused reflection light from the toner image.

<Perspective 5>

A plurality of grooves (e.g., the grooves 83) may be formed in the surface of the rotating body. The first opening 40, the second opening 41, and the light-emitting element are arranged so that diffracted light produced by the first irradiation light 46 being incident on the first irradiated region 47 is unlikely to enter the second opening 41. This makes it possible for the first light receiving unit 36 to accurately detect diffused reflection light from the toner image.

<Perspective 6>

As described with reference to FIG. 5A, the plurality of grooves 83 may extend parallel to the rotation direction of the rotating body. In this case, diffracted light can arise, and thus the optical sensor 31 described in the first to third embodiments is useful.

<Perspective 7>

As illustrated in FIG. 28, reflective properties (scattering characteristics) of the surface of the rotating body in the rotation direction of the rotating body are different from reflective properties of the surface of the rotating body in the width direction of the rotating body. In this case too, the optical sensor 31 described in the first to third embodiments is useful.

<Perspectives 8 and 9>

A first lens (e.g., the first lens unit 43) may be disposed between the first opening 40 and the first irradiated region 47. A second lens (e.g., the second lens unit 44) may be disposed between the first irradiated region 47 and the second opening 41.

<Perspectives 10 to 13>

The housing 33 may include the third opening 42 and the fourth opening (e.g., part of the second opening 41). The third opening 42 is provided in a third light guide path arranged between the light-emitting element and the second irradiated region 50, of the target surface to be irradiated, that is different from the first irradiated region. The third opening 42 is arranged so that light output from the light-emitting element travels toward the second irradiated region 50. As illustrated in FIG. 8 and the like, the fourth opening is provided in a fourth light guide path arranged between the second irradiated region 50 and the second light receiving unit 37. The fourth opening is arranged so that when the surface of the rotating body passes the second irradiated region 50, regularly-reflected light from the surface passes through the fourth opening. This makes it possible to accurately detect regularly-reflected light from the surface of the rotating body. A third lens (e.g., the third lens unit 45) may be disposed between the third opening 42 and the second irradiated region 50. The second opening and the fourth opening may be the same opening (e.g., the second opening 41).

As illustrated in FIG. 8 and the like, an optical path through which the first irradiation light 46 passes is an example of the first light guide path that guides light output from the light-emitting element toward the target surface to be irradiated, which is part of the surface of the rotating body. As illustrated in FIG. 8 and the like, an optical path through which diffused reflection light travels from the first irradiated region 47 to the first light receiving unit 36 is an example of the second light guide path that guides diffused reflection light from the target region to be irradiated which, of the target surface to be irradiated, is a region irradiated by light. The first light guide path (the first opening) satisfies the following conditions. The first condition is that the target region to be irradiated is distanced, in a first direction, from a point of intersection between a normal line of a mounting surface of the light-emitting element passing through a center of the light-emitting element and the surface of the rotating body, the first direction being a movement direction of the rotating body. The second condition is that the target region to be irradiated is distanced from the point of intersection in a second direction, the second direction being perpendicular to the first direction and parallel to a rotation axis of the rotating body (the drive roller 12b). In other words, the center of the first irradiated region 47 is shifted from a position where the normal line of the circuit board 34 passing through the LED 35 intersects with the surface of the rotating body (a position directly above the LED 35). This shift is present in both the rotation direction of the rotating body and the width direction of the rotating body. Through this, a drop in detection accuracy of an optical sensor such as a toner sensor, which can be caused by reflected light from the target surface to be irradiated, can be suppressed.

<Perspectives 14 and 23>

The photosensitive drum 1, the intermediate transfer belt 12a, the secondary transfer roller 16, and the like form an image forming unit that forms a toner image on a sheet S via the rotating body. The optical sensor 31 detects regularly-reflected light from a surface of the rotating body and diffused reflection light from the toner image carried on the surface of the rotating body. The controller 29 functions as a correction unit that corrects a position where the toner image is formed or a density of the toner image on the basis of a detection result from the optical sensor 31. This makes it possible to accurately correct color shifts, the density of the toner image, and color. The correction unit can be implemented by a processor circuit.

<Perspective 15>

As illustrated in FIG. 4A, a plurality of grooves 83 may be formed in the surface of the rotating body. As illustrated in FIG. 29A, the first irradiation light 46 is light emitted from the first opening and traveling toward the first irradiated region. The light-emitting element and the first opening are arranged so that the first irradiation light 46 is slanted in a direction in which the plurality of grooves are arranged from a normal line of a cylindrical surface produced in part of the surface of the rotating body. As illustrated in FIGS. 29A and 30A, the second opening is arranged in a position that avoids mth-order diffracted light and (m+1)th-order diffracted light among light originating from the first irradiation light 46 with which the target surface to be irradiated is irradiated (where m is an integer).

<Perspective 16>

As illustrated in FIG. 29A, the first opening and the light-emitting element may be arranged so that regularly-reflected light formed by the first irradiation light 46 reflecting at the first irradiated region travels in a direction away from the second opening and the first light receiving unit.

<Perspective 17>

As illustrated in FIG. 30A, the second opening may be arranged in a position that avoids diffracted light from a −1st order to a +1st order among light originating from the first irradiation light 46 with which the target surface to be irradiated is irradiated.

<Perspective 18>

As illustrated in FIG. 30A, the second opening is arranged in a position that avoids mth-order diffracted light and (m+1)th-order diffracted light among light originating from the first irradiation light with which the target surface to be irradiated is irradiated. In particular, the second opening may be arranged in substantially a central part between the mth-order diffracted light and the (m+1)th-order diffracted light. m is −6, for example.

<Perspective 19>

As illustrated in FIG. 30A, the first light receiving unit is disposed in a position where mth-order diffracted light and (m+1)th-order diffracted light, among light originating from the first irradiation light 46 with which the target surface to be irradiated is irradiated, are not incident (where m is an integer). m is −6, for example.

<Perspective 20>

As illustrated in FIG. 30A, the first light receiving unit, the second light receiving unit, and the light-emitting element may be arranged in a direction in which the plurality of grooves 83 formed in the rotating body are arranged (the y and y1 direction). The first light receiving unit may be disposed further from the light-emitting element than the second light receiving unit.

<Perspectives 21 and 22>

As illustrated in FIG. 30A, a first lens (e.g., the first lens unit 43) may be disposed between the first opening and the first irradiated region. A focal point of the first lens may substantially coincide with a position of the light-emitting element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-024665, filed Feb. 17, 2020 and Japanese Patent Application No. 2020-206985, filed Dec. 14, 2020 which are hereby incorporated by reference herein in their entirety.

What is claimed is:

1. An optical sensor comprising:
   a light-emitting element that irradiates, with light, a target surface to be irradiated set in one part of a surface of a rotating body that rotates;
   a first light receiving unit that receives diffused reflection light from a toner image formed on the surface of the rotating body, and a second light receiving unit that receives regularly-reflected light from the surface of the rotating body;
   a circuit board on which the light-emitting element, the first light receiving unit, and the second light receiving unit are mounted; and
   a housing including a first opening and a second opening, the housing being provided so as to enclose the light-emitting element, the first light receiving unit, and the second light receiving unit,
   wherein the first opening is provided in a first light guide path arranged between the light-emitting element and an irradiated region of the target surface to be irradiated, the first opening being arranged so that light output from the light-emitting element travels toward the irradiated region, and
   wherein the second opening is provided in a second light guide path arranged between the irradiated region and the first light receiving unit, the second opening being arranged so that diffused reflection light from the toner image passes through when the toner image passes the irradiated region, and regularly-reflected light, as well as diffused reflection light or diffracted light, from the surface of the rotating body do not pass through when the surface of the rotating body passes the irradiated region.

2. The optical sensor according to claim 1, wherein the rotating body is an endless belt stretched between a drive roller and a driven roller having cylindrical shapes,
   wherein the surface of the rotating body is a side surface of a cylindrical shape formed by the endless belt wrapping around the drive roller or the driven roller, and
   wherein the light-emitting element and the first opening are arranged so that first irradiation light emitted from the first opening and traveling toward the irradiated region is slanted relative to a normal line of the side surface of the cylindrical shape in both a rotation direction of the rotating body and an axial direction of the rotating body.

3. The optical sensor according to claim 2, wherein the first opening and the light-emitting element are arranged so that regularly-reflected light formed by the first irradiation light reflecting at the irradiated region travels in a direction away from the second opening and the first light receiving unit.

4. The optical sensor according to claim 2, wherein a plurality of grooves are formed in the surface of the rotating body, and
   wherein the first opening, the second opening, and the light-emitting element are arranged so that diffracted light produced by the first irradiation light being incident on the irradiated region is unlikely to enter the second opening.

5. The optical sensor according to claim 4, wherein the plurality of grooves extend parallel to the rotation direction of the rotating body.

6. The optical sensor according to claim 1, wherein the rotating body is an endless belt stretched between a drive roller and a driven roller having cylindrical shapes,
   wherein the surface of the rotating body is a flat surface, of an outer circumferential surface of the endless belt, located between the drive roller and the driven roller, and
   wherein the light-emitting element and the first opening are arranged so that first irradiation light emitted from the first opening and traveling toward the irradiated region is slanted relative to a normal line of the flat surface in both a rotation direction of the rotating body and an axial direction of the rotating body.

7. The optical sensor according to claim 1, wherein reflective properties of the surface of the rotating body in the rotation direction of the rotating body are different from reflective properties of the surface of the rotating body in the width direction of the rotating body.

8. The optical sensor according to claim 1, wherein a lens is disposed between the first opening and the irradiated region.

9. The optical sensor according to claim 8, wherein a focal point of the first lens substantially coincides with a position of the light-emitting element.

10. The optical sensor according to claim 1, wherein a lens is disposed between the irradiated region and the second opening.

11. The optical sensor according to claim 1, wherein the irradiated region is a first irradiated region,
wherein the housing includes a third opening and a fourth opening,
wherein the third opening is provided in a third light guide path arranged between the light-emitting element and a second irradiated region of the target surface to be irradiated that is different from the first irradiated region, and is arranged so that light output from the light-emitting element travels toward the second irradiated region, and
wherein the fourth opening is provided in a fourth light guide path arranged between the second irradiated region and the second light receiving unit, and is arranged so that when the surface of the rotating body passes the second irradiated region, regularly-reflected light from the surface passes through the fourth opening.

12. The optical sensor according to claim 11, wherein a third lens is disposed between the third opening and the second irradiated region.

13. The optical sensor according to claim 11, wherein the second opening and the fourth opening are the same opening.

14. The optical sensor according to claim 1, wherein a plurality of grooves are formed in the surface of the rotating body,
wherein the light-emitting element and the first opening are arranged so that first irradiation light emitted from the first opening and traveling toward the irradiated region is slanted in a direction in which the plurality of grooves are arranged from a normal line of a cylindrical surface produced in part of the surface of the rotating body, and
wherein the second opening is arranged in a position that avoids mth-order diffracted light and (m+1)th-order diffracted light among light originating from the first irradiation light with which the target surface to be irradiated is irradiated (where m is an integer).

15. The optical sensor according to claim 1, wherein the first opening and the light-emitting element are arranged so that regularly-reflected light formed by first irradiation light reflecting at the irradiated region travels in a direction away from the second opening and the first light receiving unit, the first irradiation light being light emitted from the first opening and traveling toward the irradiated region.

16. The optical sensor according to claim 1, wherein the second opening is arranged in a position that avoids diffracted light from a −1st order to a +1st order among light originating from the first irradiation light with which the target surface to be irradiated is irradiated.

17. The optical sensor according to claim 1, wherein the second opening is arranged in a position that avoids mth-order diffracted light and (m+1)th-order diffracted light among light originating from the first irradiation light with which the target surface to be irradiated is irradiated, and that is in substantially a central part between the mth-order diffracted light and the (m+1)th-order diffracted light (where m is an integer).

18. The optical sensor according to claim 1, wherein the first light receiving unit is disposed in a position where mth-order diffracted light and (m+1)th-order diffracted light, among light originating from the first irradiation light with which the target surface to be irradiated is irradiated, are not incident (where m is an integer).

19. The optical sensor according to claim 1, wherein the first light receiving unit, the second light receiving unit, and the light-emitting element are arranged in a direction in which a plurality of grooves formed in the rotating body are arranged, and
wherein the first light receiving unit is disposed farther from the light-emitting element than the second light receiving unit.

20. An image forming apparatus comprising:
an image forming unit that forms a toner image on a sheet via a rotating body;
an optical sensor that detects regularly-reflected light from a surface of the rotating body and diffused reflection light from the toner image carried on the surface of the rotating body; and
a correction unit that corrects a position where the toner image is formed or a density of the toner image on the basis of a detection result from the optical sensor,
wherein the optical sensor comprises:
a light-emitting element that irradiates, with light, a target surface to be irradiated set in one part of a surface of a rotating body that rotates;
a first light receiving unit that receives diffused reflection light from a toner image formed on the surface of the rotating body, and a second light receiving unit that receives regularly-reflected light from the surface of the rotating body;
a circuit board on which the light-emitting element, the first light receiving unit, and the second light receiving unit are mounted; and
a housing including a first opening and a second opening, and provided so as to enclose the light-emitting element, the first light receiving unit, and the second light receiving unit,
wherein the first opening is provided in a first light guide path arranged between the light-emitting element and an irradiated region of the target surface to be irradiated, the first opening being arranged so that light output from the light-emitting element travels toward the irradiated region, and
wherein the second opening is provided in a second light guide path arranged between the first irradiated region and the first light receiving unit, the second opening being arranged so that diffused reflection light from the toner image passes through when the toner image passes the irradiated region, and regularly-reflected light, as well as diffused reflection light or diffracted light, from the surface of the rotating body do not pass through when the surface of the rotating body passes the irradiated region.

* * * * *